(12) United States Patent
DeGrace et al.

(10) Patent No.: US 12,344,907 B2
(45) Date of Patent: Jul. 1, 2025

(54) LASER HARDENING OF CYLINDER BORE

(71) Applicant: GM Global Technology Operations LLC, Detroit, MI (US)

(72) Inventors: Garrold A. DeGrace, Frankenmuth, MI (US); Sheri K. Kurgin, Macomb Township, MI (US); Daniel T. Berry, South Lyon, MI (US); Kirk R. Frame, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 405 days.

(21) Appl. No.: 18/170,796

(22) Filed: Feb. 17, 2023

(65) Prior Publication Data

US 2024/0279761 A1    Aug. 22, 2024

(51) Int. Cl.
*C21D 1/09*        (2006.01)
*B23K 26/08*       (2014.01)
*B23K 26/352*      (2014.01)

(52) U.S. Cl.
CPC .............. *C21D 1/09* (2013.01); *B23K 26/083* (2013.01); *B23K 26/352* (2015.10); *C21D 2221/00* (2013.01)

(58) Field of Classification Search
CPC .... C21D 1/09; C21D 2221/00; B23K 26/352; B23K 26/083
USPC ........................................................ 148/565
See application file for complete search history.

(56) References Cited

U.S. PATENT DOCUMENTS 4,017,708 A * 4/1977 Engel ................. B23K 26/1438
148/903

* cited by examiner

*Primary Examiner* — Ricardo D Morales
(74) *Attorney, Agent, or Firm* — Vivacqua Crane, PLLC

(57) ABSTRACT

A system for heat treating cylinder bores within an engine includes a laser head and a controller adapted to cause the laser head to move to each cylinder bore and create a first plurality of hardened pills within each one of a first plurality of positional zones, cause the laser head to move to each cylinder bore and create a second plurality of hardened pills within each one of the first plurality of positional zones, cause the laser head to move to each cylinder bore and create a first plurality of hardened pills within each one of a second plurality of positional zones, cause the laser head to move to each cylinder bore and create a second plurality of hardened pills within each one of the second plurality of positional zones.

20 Claims, 7 Drawing Sheets

LASER HARDENING OF CYLINDER BORE

INTRODUCTION

The present disclosure relates to heat treatment of cylinder bores within an engine block. Current methods for treating an inner surface of cylinder bores within an engine block may result in stress fractures that compromise the strength and integrity of the cylinder bore, particularly at or near thin walled section of the cylinder bore.

Thus, while current heat treatment methods achieve their intended purpose, there is a need for a new and improved system and method for heat treating the inner surface of the cylinder bores within an engine block that minimizes thermal damage by distributing the thermal energy uniformly around a cylindrical hardening zone.

SUMMARY

According to several aspects of the present disclosure, a method of heat treating a plurality of cylinder bores within an engine block includes moving a laser head, adapted to heat treat a localized area of an inner surface of a cylinder bore, sequentially to each of a plurality of cylinder bores within the engine, at each cylinder bore, moving the laser head, sequentially, in a star pattern, to each one of a first plurality of positional zones extending circumferentially around the cylinder bore, at each one of the first plurality of positional zones, creating, with the laser head, sequentially, one at a time, a first plurality of discrete hardened pills therein, moving the laser head sequentially to each of the plurality of cylinder bores within the engine, at each cylinder bore, moving the laser head, sequentially, in a star pattern, to each one of a first plurality of positional zones extending circumferentially around the cylinder bore, at each one of the first plurality of positional zones, creating, with the laser head, sequentially, one at a time, a second plurality of discrete hardened pills therein, moving the laser head sequentially to each of the plurality of cylinder bores within the engine, at each cylinder bore, moving the laser head, sequentially, in a star pattern, to each one of a second plurality of positional zones extending circumferentially around the cylinder bore, at each one of the second plurality of positional zones, creating, with the laser head, sequentially, one at a time, a first plurality of discrete hardened pills therein, moving the laser head sequentially to each of the plurality of cylinder bores within the engine, at each cylinder bore, moving the laser head, sequentially, in a star pattern, to each one of a second plurality of positional zones extending circumferentially around the cylinder bore, and at each one of the second plurality of positional zones, creating, with the laser head, sequentially, one at a time, a second plurality of discrete hardened pills therein.

According to another aspect, each of the plurality of cylinder bores includes twelve positional zones adjacent one another and extending circumferentially around the cylinder bore.

According to another aspect, the first plurality of positional zones includes a first positional zone, a third positional zone, a fifth positional zone, a seventh positional zone, a ninth positional zone and an eleventh positional zone, wherein, the moving the laser head, sequentially, in a star pattern, to each one of the first plurality of positional zones extending circumferentially around the cylinder bore further includes, moving the laser head, sequentially, starting at the fifth positional zone to the eleventh positional zone, from the eleventh positional zone to the seventh positional zone, from the seventh positional zone to the first positional zone, from the first positional zone to the ninth positional zone, and from the ninth positional zone to the third positional zone.

According to another aspect, the second plurality of positional zones includes a second positional zone, a fourth positional zone, a sixth positional zone, an eighth positional zone, a tenth positional zone and a twelfth positional zone, wherein, the moving the laser head, sequentially, in a star pattern, to each one of the second plurality of positional zones extending circumferentially around the cylinder bore further includes, moving the laser head, sequentially, starting at the sixth positional zone to the twelfth positional zone, from the twelfth positional zone to the eighth positional zone, from the eighth positional zone to the second positional zone, from the second positional zone to the tenth positional zone, and from the tenth positional zone to the fourth positional zone.

According to another aspect, the first plurality of discrete hardened pills includes a first discrete hardened pill, a third discrete hardened pill and a fifth discrete hardened pill, and the second plurality of discrete hardened pills includes a second discrete hardened pill and a fourth discrete hardened pill.

According to another aspect, the creating, with the laser head, sequentially, one at a time, the first plurality of discrete hardened pills further includes creating, with the laser head, the first discrete hardened pill, creating, with the laser head, the third discrete hardened pill, and creating, with the laser head, the fifth discrete hardened pill, and, the creating, with the laser head, sequentially, one at a time, the second plurality of discrete hardened pills further includes creating, with the laser head, the second discrete hardened pill, and, creating, with the laser head, the fourth discrete hardened pill.

According to another aspect, the engine includes eight cylinder bores and the laser head is a dual laser head unit, wherein, the moving the laser head, adapted to heat treat a localized area of an inner surface of a cylinder bore, sequentially to each of the plurality of cylinder bores within the engine further includes moving the dual laser head unit such that a first laser head is engaged with a first cylinder bore and a second laser head is engaged with a second cylinder bore, moving the dual laser head unit such that the first laser head is engaged with a fifth cylinder bore and the second laser head is engaged with a sixth cylinder bore, moving the dual laser head unit such that the first laser head is engaged with a seventh cylinder bore and the second laser head is engaged with an eighth cylinder bore, and moving the dual laser head unit such that the first laser head is engaged with a third cylinder bore and the second laser head is engaged with a fourth cylinder bore.

According to another aspect, the method further includes moving the dual laser head unit such that the first laser head is engaged with the first cylinder bore and the second laser head is engaged with the second cylinder bore, moving the first and second laser heads, sequentially, starting at the fifth positional zone, to the eleventh positional zone, the seventh positional zone, the first positional zone, the ninth positional zone, the third positional zone, the sixth positional zone, the twelfth positional zone, the eighth positional zone, the second positional zone, the tenth positional zone and the fourth positional zone within the first and second cylinder bores, at each one of the fifth, eleventh, seventh, first, ninth and third positional zones within each of the first and second cylinder bores, simultaneously tempering, with the first and second laser heads, each of the first and second plurality of discrete hardened pills, and, at each one of the sixth, twelfth, eighth, second, tenth and fourth positional zones within each of the first and second cylinder bores, simultaneously tempering, with the first and second laser heads, each of the first and second plurality of discrete hardened pills, moving the dual laser head unit such that the first laser head is engaged with the fifth cylinder bore and the second laser head is engaged with the sixth cylinder bore, moving the first and second laser heads, sequentially, starting at the fifth positional zone, to the eleventh positional zone, the seventh positional zone, the first positional zone, the ninth positional zone, the third positional zone, the sixth positional zone, the twelfth positional zone, the eighth positional zone, the second positional zone, the tenth positional zone and the fourth positional zone within the fifth and sixth cylinder bores, at each one of the fifth, eleventh, seventh, first, ninth and third positional zones within each of the fifth and sixth cylinder bores, simultaneously tempering, with the first and second laser heads, each of the first and second plurality of discrete hardened pills, at each one of the sixth, twelfth, eighth, second, tenth and fourth positional zones within each of the fifth and sixth cylinder bores, simultaneously tempering, with the first and second laser heads, each of the first and second plurality of discrete hardened pills, moving the dual laser head unit such that the first laser head is engaged with the seventh cylinder bore and the second laser head is engaged with the eighth cylinder bore, moving the first and second laser heads, sequentially, starting at the fifth positional zone, to the eleventh positional zone, the seventh positional zone, the first positional zone, the ninth positional zone, the third positional zone, the sixth positional zone, the twelfth positional zone, the eighth positional zone, the second positional zone, the tenth positional zone and the fourth positional zone within the seventh and eighth cylinder bores, at each one of the fifth, eleventh, seventh, first, ninth and third positional zones within each of the seventh and eighth cylinder bores, simultaneously tempering, with the first and second laser heads, each of the first and second plurality of discrete hardened pills, at each one of the sixth, twelfth, eighth, second, tenth and fourth positional zones within each of the seventh and eighth cylinder bores, simultaneously tempering, with the first and second laser heads, each of the first and second plurality of discrete hardened pills, moving the dual laser head unit such that the first laser head is engaged with the third cylinder bore and the second laser head is engaged with the fourth cylinder bore, moving the first and second laser heads, sequentially, starting at the fifth positional zone, to the eleventh positional zone, the seventh positional zone, the first positional zone, the ninth positional zone, the third positional zone, the sixth positional zone, the twelfth positional zone, the eighth positional zone, the second positional zone, the tenth positional zone and the fourth positional zone within the third and fourth cylinder bores, at each one of the fifth, eleventh, seventh, first, ninth and third positional zones within each of the third and fourth cylinder bores, simultaneously tempering, with the first and second laser heads, each of the first and second plurality of discrete hardened pills, and, at each one of the sixth, twelfth, eighth, second, tenth and fourth positional zones within each of the third and fourth cylinder bores, simultaneously tempering, with the first and second laser heads, each of the first and second plurality of discrete hardened pills.

According to another aspect, the engine includes eight cylinder bores and the laser head is a four laser head unit, wherein, the moving the laser head, adapted to heat treat a localized area of an inner surface of a cylinder bore, sequentially to each of the plurality of cylinder bores within the engine further includes, moving the four laser head unit such that a first laser head is engaged with a first cylinder bore, a second laser head is engaged with a second cylinder bore, a third laser head is engaged with a fifth cylinder bore and a fourth laser head is engaged with a sixth cylinder bore, and, moving the four laser head unit such that a first laser head is engaged with a third cylinder bore, a second laser head is engaged with a fourth cylinder bore, a third laser head is engaged with a seventh cylinder bore and a fourth laser head is engaged with an eighth cylinder bore.

According to another aspect of the present disclosure, the method further includes moving the four laser head unit such that a first laser head is engaged with a first cylinder bore, a second laser head is engaged with a second cylinder bore, a third laser head is engaged with a fifth cylinder bore and a fourth laser head is engaged with a sixth cylinder bore, moving the first, second, third and fourth laser heads, sequentially, starting at the fifth positional zone, to the eleventh positional zone, the seventh positional zone, the first positional zone, the ninth positional zone, the third positional zone, the sixth positional zone, the twelfth positional zone, the eighth positional zone, the second positional zone, the tenth positional zone and the fourth positional zone within the first, second, fifth and sixth cylinder bores, at each one of the fifth, eleventh, seventh, first, ninth and third positional zones within each of the first, second, fifth and sixth cylinder bores, simultaneously tempering, with the first, second, third and fourth laser heads, each of the first and second plurality of discrete hardened pills, and, at each one of the sixth, twelfth, eighth, second, tenth and fourth positional zones within each of the first, second, fifth and sixth cylinder bores, simultaneously tempering, with the first, second, third and fourth laser heads, each of the first and second plurality of discrete hardened pills, moving the four laser head unit such that the first laser head is engaged with a third cylinder bore, the second laser head is engaged with a fourth cylinder bore, the third laser head is engaged with a seventh cylinder bore and the fourth laser head is engaged with an eighth cylinder bore, moving the first, second, third and fourth laser heads, sequentially, starting at the fifth positional zone, to the eleventh positional zone, the seventh positional zone, the first positional zone, the ninth positional zone, the third positional zone, the sixth positional zone, the twelfth positional zone, the eighth positional zone, the second positional zone, the tenth positional zone and the fourth positional zone within the third, fourth, seventh and eighth cylinder bores, at each one of the fifth, eleventh, seventh, first, ninth and third positional zones within each of the third, fourth, seventh and eighth cylinder bores, simultaneously tempering, with the first, second, third and fourth laser heads, each of the first and second plurality of discrete hardened pills, and, at each one of the sixth, twelfth, eighth, second, tenth and fourth positional zones within each of the third, fourth, seventh and eighth cylinder bores, simultaneously tempering, with the first, second, third and fourth laser heads, each of the first and second plurality of discrete hardened pills.

According to several aspects of the present disclosure, a system for heat treating a plurality of cylinder bores within an engine includes a laser head adapted to heat treat a localized area of an inner surface of a cylinder bore, and a controller adapted to cause the laser head to move sequentially to each of the plurality of cylinder bores within the engine, at each cylinder bore, cause the laser head to move sequentially, in a star pattern, to each one of a first plurality of positional zones extending circumferentially around the cylinder bore, at each one of the first plurality of positional zones, cause the laser head to create, sequentially, one at a time, a first plurality of discrete hardened pills therein, cause the laser head to move sequentially to each of the plurality of cylinder bores within the engine, at each cylinder bore, cause the laser head to move, sequentially, in a star pattern, to each one of the first plurality of positional zones extending circumferentially around the cylinder bore, at each one of the first plurality of positional zones, cause the laser head to create, sequentially, one at a time, a second plurality of discrete hardened pills therein, cause the laser head to move sequentially to each of the plurality of cylinder bores within the engine, at each cylinder bore, cause the laser head to move, sequentially, in a star pattern, to each one of a second plurality of positional zones extending circumferentially around the cylinder bore, at each one of the second plurality of positional zones, cause the laser head to create, sequentially, one at a time, a first plurality of discrete hardened pills therein, cause the laser head to move sequentially to each of the plurality of cylinder bores within the engine, at each cylinder bore, cause the laser head to move, sequentially, in a star pattern, to each one of the second plurality of positional zones extending circumferentially around the cylinder bore, and, at each one of the second plurality of positional zones, cause the laser head to create, sequentially, one at a time, a second plurality of discrete hardened pills therein.

According to another aspect, each of the plurality of cylinder bores includes twelve positional zones adjacent one another and extending circumferentially around the cylinder bore.

According to another aspect, the first plurality of positional zones includes first, third, fifth, seventh, ninth and eleventh positional zones, wherein, the controller is adapted to cause the laser head to move, sequentially, starting at the fifth positional zone to the eleventh positional zone, from the eleventh positional zone to the seventh positional zone, from the seventh positional zone to the first positional zone, from the first positional zone to the ninth positional zone, and from the ninth positional zone to the third positional zone.

According to another aspect, the second plurality of positional zones includes second, fourth, sixth, eighth, tenth and twelfth positional zones, wherein, the controller is adapted to cause the laser head to move, sequentially, starting at the sixth positional zone to the twelfth positional zone, from the twelfth positional zone to the eighth positional zone, from the eighth positional zone to the second positional zone, from the second positional zone to the tenth positional zone, and from the tenth positional zone to the fourth positional zone.

According to another aspect, the first plurality of discrete hardened pills includes a first discrete hardened pill, a third discrete hardened pill and a fifth discrete hardened pill, and the second plurality of discrete hardened pills includes a second discrete hardened pill and a fourth discrete hardened pill, wherein, when creating, with the laser head, sequentially, one at a time, the first plurality of discrete hardened pills, the controller is further adapted to cause the laser head to create the first discrete hardened pill, cause the laser head to create the third discrete hardened pill, and cause the laser head to create the fifth discrete hardened pill, and, when creating, with the laser head, sequentially, one at a time, the second plurality of discrete hardened pills, the controller is further adapted to cause the laser head to create the second discrete hardened pill and cause the laser head to create the fourth discrete hardened pill.

According to another aspect, the engine includes eight cylinder bores and the laser head is a dual laser head unit, wherein, when moving the laser head sequentially to each of the plurality of cylinder bores within the engine, the controller is further adapted to cause the dual laser head unit to move such that a first laser head is engaged with a first cylinder bore and a second laser head is engaged with a second cylinder bore, cause the dual laser head unit to move such that the first laser head is engaged with a fifth cylinder bore and the second laser head is engaged with a sixth cylinder bore, cause the dual laser head unit to move such that the first laser head is engaged with a seventh cylinder bore and the second laser head is engaged with an eighth cylinder bore, and cause the dual laser head unit to move such that the first laser head is engaged with a third cylinder bore and the second laser head is engaged with a fourth cylinder bore.

According to another aspect, the controller is further adapted to cause the dual laser head unit to move such that the first laser head is engaged with the first cylinder bore and the second laser head is engaged with the second cylinder bore, cause the first and second laser heads to move, sequentially, starting at the fifth positional zone, to the eleventh positional zone, the seventh positional zone, the first positional zone, the ninth positional zone, the third positional zone, the sixth positional zone, the twelfth positional zone, the eighth positional zone, the second positional zone, the tenth positional zone and the fourth positional zone within the first and second cylinder bores, at each one of the fifth, eleventh, seventh, first, ninth and third positional zones within each of the first and second cylinder bores, cause the first and second laser heads to simultaneously temper each of the first and second plurality of discrete hardened pills, and, at each one of the sixth, twelfth, eighth, second, tenth and fourth positional zones within each of the first and second cylinder bores, cause the first and second laser heads to simultaneously temper each of the first and second plurality of discrete hardened pills, cause the dual laser head unit to move such that the first laser head is engaged with the fifth cylinder bore and the second laser head is engaged with the sixth cylinder bore, cause the first and second laser heads to move, sequentially, starting at the fifth positional zone, to the eleventh positional zone, the seventh positional zone, the first positional zone, the ninth positional zone, the third positional zone, the sixth positional zone, the twelfth positional zone, the eighth positional zone, the second positional zone, the tenth positional zone and the fourth positional zone within the fifth and sixth cylinder bores, at each one of the fifth, eleventh, seventh, first, ninth and third positional zones within each of the fifth and sixth cylinder bores, cause the first and second laser heads to simultaneously temper each of the first and second plurality of discrete hardened pills, at each one of the sixth, twelfth, eighth, second, tenth and fourth positional zones within each of the fifth and sixth cylinder bores, cause the first and second laser heads to simultaneously temper each of the first and second plurality of discrete hardened pills, cause the dual laser head unit to move such that the first laser head is engaged with the seventh cylinder bore and the second laser head is engaged with the eighth cylinder bore, cause the first and second laser heads to move, sequentially, starting at the fifth positional zone, to the eleventh positional zone, the seventh positional zone, the first positional zone, the ninth positional zone, the third positional zone, the sixth positional zone, the twelfth positional zone, the eighth positional zone, the second positional zone, the tenth positional zone and the fourth positional zone within the seventh and eighth cylinder bores, at each one of the fifth, eleventh, seventh, first, ninth and third positional zones within each of the seventh and eighth cylinder bores, cause the first and second laser heads to simultaneously temper each of the first and second plurality of discrete hardened pills, at each one of the sixth, twelfth, eighth, second, tenth and fourth positional zones within each of the seventh and eighth cylinder bores, cause the first and second laser heads to simultaneously temper each of the first and second plurality of discrete hardened pills, cause the dual laser head unit to move such that the first laser head is engaged with the third cylinder bore and the second laser head is engaged with the fourth cylinder bore; cause the first and second laser heads to move, sequentially, starting at the fifth positional zone, to the eleventh positional zone, the seventh positional zone, the first positional zone, the ninth positional zone, the third positional zone, the sixth positional zone, the twelfth positional zone, the eighth positional zone, the second positional zone, the tenth positional zone and the fourth positional zone within the third and fourth cylinder bores, at each one of the fifth, eleventh, seventh, first, ninth and third positional zones within each of the third and fourth cylinder bores, cause the first and second laser heads to simultaneously temper each of the first and second plurality of discrete hardened pills, and, at each one of the sixth, twelfth, eighth, second, tenth and fourth positional zones within each of the third and fourth cylinder bores, cause the first and second laser heads to simultaneously tempering each of the first and second plurality of discrete hardened pills.

According to another aspect, the engine includes eight cylinder bores and the laser head is a four laser head unit, wherein, when moving the laser head sequentially to each of the plurality of cylinder bores within the engine, the controller is further adapted to cause the four laser head unit to move such that a first laser head is engaged with a first cylinder bore, a second laser head is engaged with a second cylinder bore, a third laser head is engaged with a fifth cylinder bore and a fourth laser head is engaged with a sixth cylinder bore, and cause the four laser head unit to move such that a first laser head is engaged with a third cylinder bore, a second laser head is engaged with a fourth cylinder bore, a third laser head is engaged with a seventh cylinder bore and a fourth laser head is engaged with an eighth cylinder bore.

According to another aspect, the controller is further adapted to cause the four laser head unit to move such that a first laser head is engaged with a first cylinder bore, a second laser head is engaged with a second cylinder bore, a third laser head is engaged with a fifth cylinder bore and a fourth laser head is engaged with a sixth cylinder bore, cause the first, second, third and fourth laser heads to move, sequentially, starting at the fifth positional zone, to the eleventh positional zone, the seventh positional zone, the first positional zone, the ninth positional zone, the third positional zone, the sixth positional zone, the twelfth positional zone, the eighth positional zone, the second positional zone, the tenth positional zone and the fourth positional zone within the first, second, fifth and sixth cylinder bores, at each one of the fifth, eleventh, seventh, first, ninth and third positional zones within each of the first, second, fifth and sixth cylinder bores, cause the first, second, third and fourth laser heads to simultaneously temper each of the first and second plurality of discrete hardened pills, and, at each one of the sixth, twelfth, eighth, second, tenth and fourth positional zones within each of the first, second, fifth and sixth cylinder bores, cause the first, second, third and fourth laser heads to simultaneously temper each of the first and second plurality of discrete hardened pills, cause the four laser head unit to move such that the first laser head is engaged with a third cylinder bore, the second laser head is engaged with a fourth cylinder bore, the third laser head is engaged with a seventh cylinder bore and the fourth laser head is engaged with an eighth cylinder bore, cause the first, second, third and fourth laser heads to move, sequentially, starting at the fifth positional zone, to the eleventh positional zone, the seventh positional zone, the first positional zone, the ninth positional zone, the third positional zone, the sixth positional zone, the twelfth positional zone, the eighth positional zone, the second positional zone, the tenth positional zone and the fourth positional zone within the third, fourth, seventh and eighth cylinder bores, at each one of the fifth, eleventh, seventh, first, ninth and third positional zones within each of the third, fourth, seventh and eighth cylinder bores, cause the first, second, third and fourth laser heads to simultaneously temper each of the first and second plurality of discrete hardened pills, and at each one of the sixth, twelfth, eighth, second, tenth and fourth positional zones within each of the third, fourth, seventh and eighth cylinder bores, cause the first, second, third and fourth laser heads to simultaneously temper each of the first and second plurality of discrete hardened pills.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
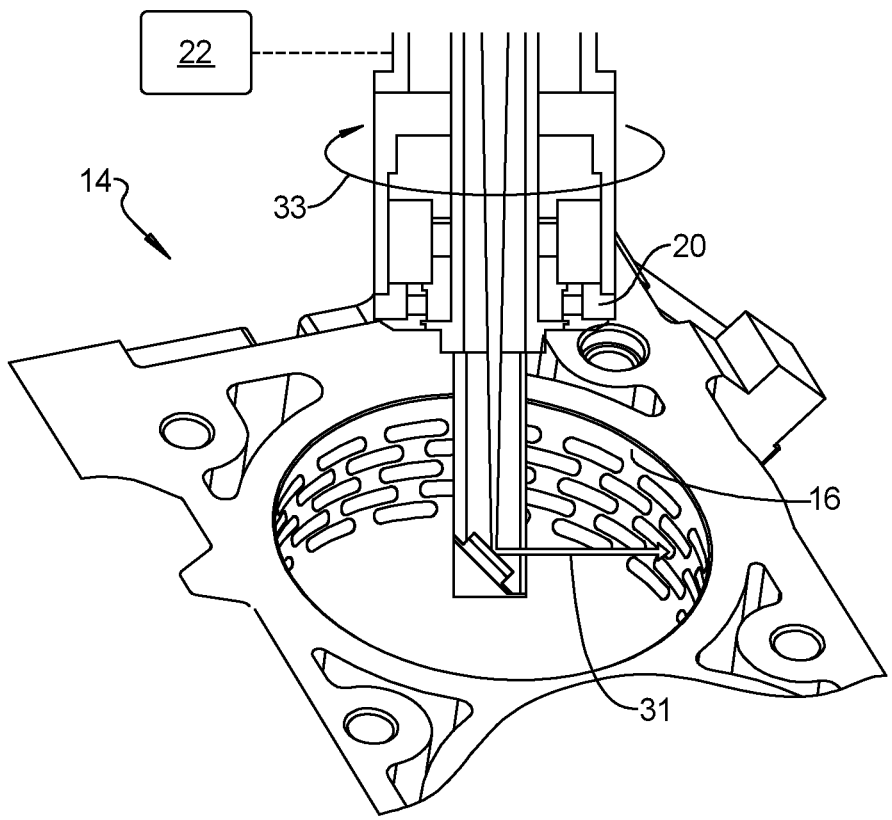
FIG. 1 is a perspective view of a laser head engaged with a cylinder bore according to an exemplary embodiment.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Referring to FIG. 1, a system 14 for heat treating a plurality of cylinder bores 16 within an engine block 18 includes a laser head 20 and a controller 22. The laser head 20 is adapted to heat treat a localized area 24 of an inner surface 26 of a cylinder bore 16 within an engine block 18.

Heat treating is the controlled heating and cooling of a metal in order to change its physical and mechanical properties without changing its shape. Several types of heat treatments may be used at various stages in a part's life. It is often associated with the ability to increase the strength of a metal such as cast iron, steel, aluminum or some other alloy, but it is a process that can also be used to improve machining and formability, and restore ductility after a cold working operation. Therefore, heat treating can be very beneficial to the manufacturing process and can help improve product performance by greatly increasing material strength.

In a steel engine block, the inner surface of cylinder bores may be done with a hardening/quenching process. In an aluminum engine block, often cylinder bores include steel liners or cladding, which provide harness and wear resistance characteristics suitable for the cylinder bore. Heat treating is done to strengthen the material and also to increase the wear properties of the metal. Steel is made up of iron and carbon. During its formation, steel can only dissolve a certain amount of carbon while the rest turns into graphite. When steel is heated, it will harden at around 1,500° F. (depending on the exact mixture of the alloy) and transform the atoms from the center to the face of a molecule. This transformation happens at the austenite melting point during the heating process, which is the point at which the material melts and absorbs to become one solid. Once the carbon is dissolved, the part must then be rapidly cooled (quenched) to trap the carbon structure in its new form. As the atoms try to push back to their original form, this stress is what creates the hardness in the metal. By varying the rate of quenching, the metal's grain size and grain patterns are controlled to produce different levels of hardness and tensile strength. For the most part, the faster the metal is quenched, the smaller the grain size will be, making the metal harder. And as hardness and the strength of the metal increase, toughness and ductility will decrease. Typically, steel components are quenched in oil or water but there are other methods as well, including salt baths and others.

Modern heat treatment techniques include laser scanning with a laser head adapted to apply a laser beam to the inner surface of the cylinder bore. The laser beam heats up areas close to the surface to between 900° C. and 1500° C., causing the heat-induced austenitization of the originally ferritic-pearlitic steel structure. When the beam moves on, the inner surface of the cylinder bore cools down quickly (self-quenching), creating hard martensite. Lasers are more efficient that induction or direct flames because the steel heats up more quickly, and the laser provides more selective and more precise heating. In addition, with lasers, the heat input can be dosed in an exact manner by using beam shaping optics with integrated pyrometers or thermal cameras. This makes heat treatment with laser scanning well-suited to treating geometric complex structures that require hardening in some zones but have to keep their ductility in others. This treatment is especially ideal for the inner surface of cylinder bores, where steel pistons/rings rub against the steel inner surface of the cylinder bore. Contact zones between pistons/rings and the inner surface of the cylinder bore need to be hardened, otherwise the parts are unlikely to have much longevity.

Tempering is done by heating a hardened area to a temperature below the transformation range to produce desired properties. The object of tempering or "drawing" is to reduce the brittleness in hardened steel and to remove the internal strains caused by sudden cooling.

Figure 2:
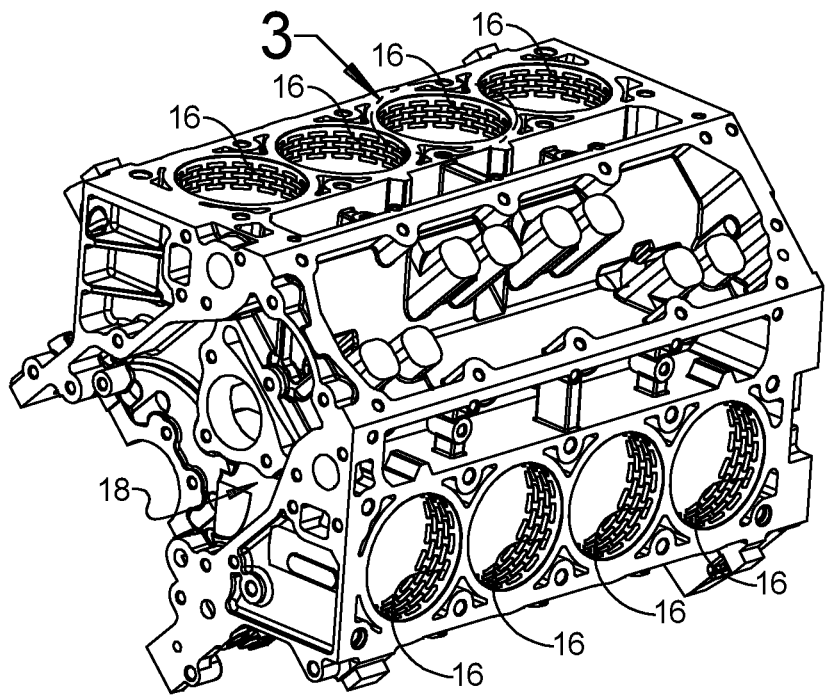
FIG. 2 is a perspective view of an engine block having a plurality of cylinder bores therein.
Figure 3:
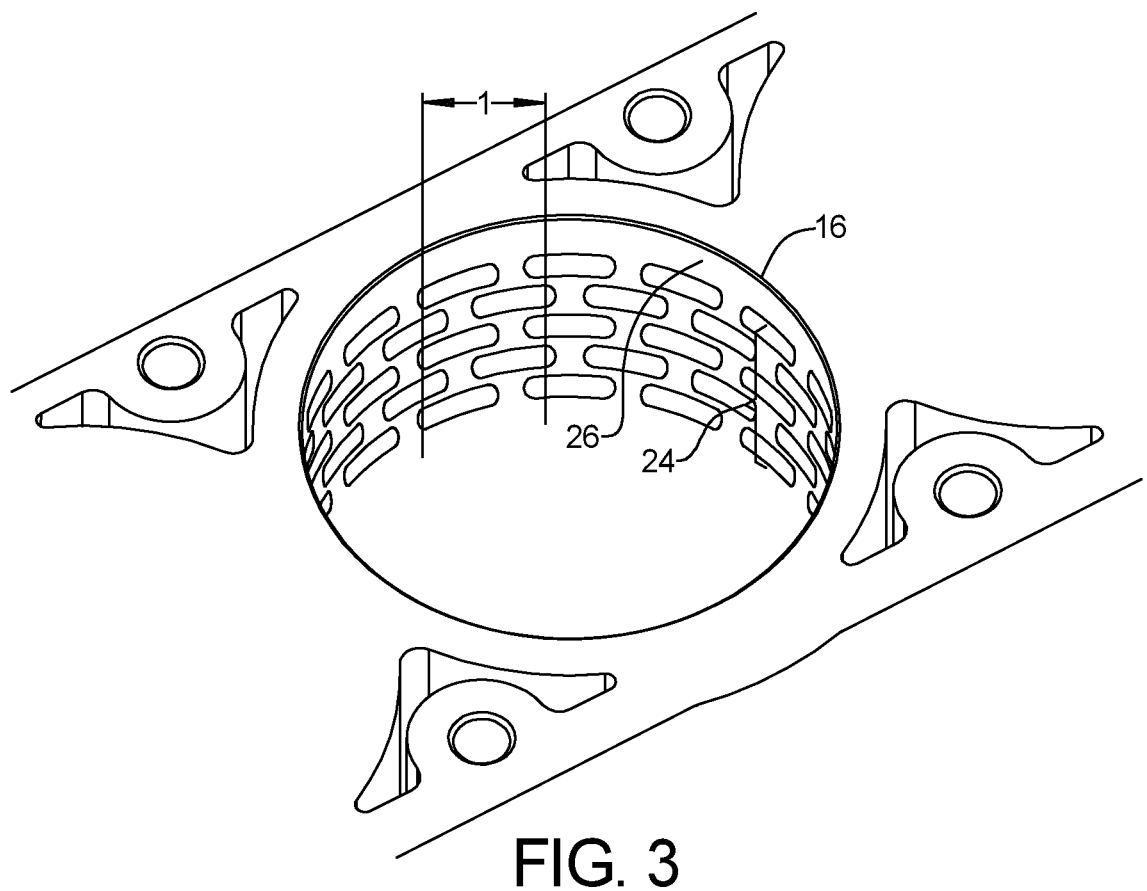
FIG. 3 is an enlarged view of a cylinder bore from FIG. 2, illustrating a positional zone and a heat treated region within the cylinder bore.
Figure 4:
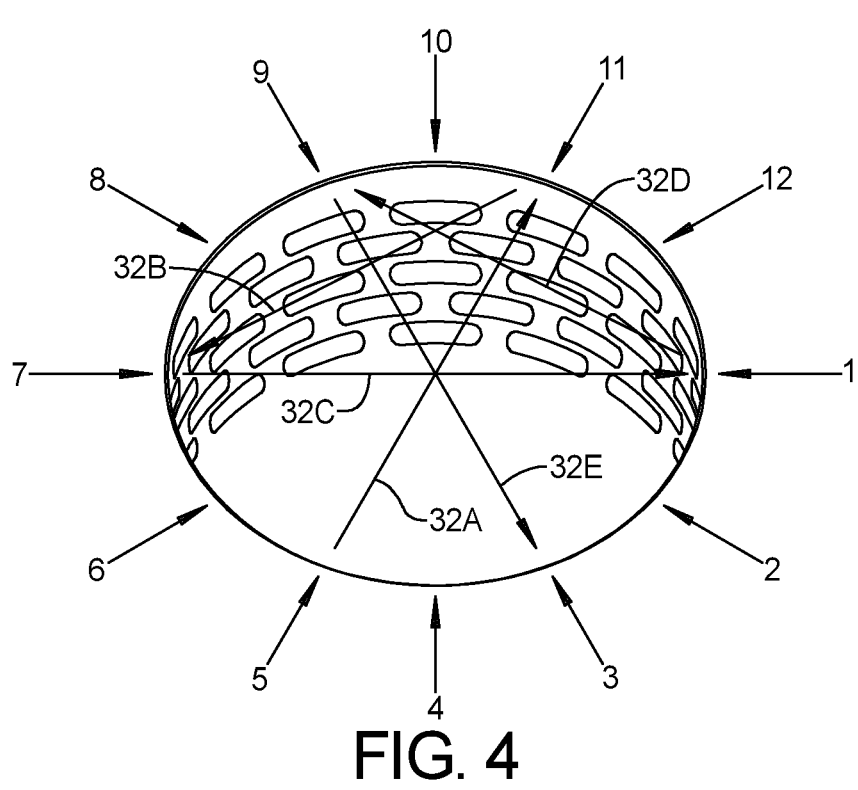
FIG. 4 is a perspective view of a cylinder bore illustrating the twelve positional zones and arrows indicating the movement of the laser head, in a start pattern, through the first plurality of positional zones.
Figure 5:
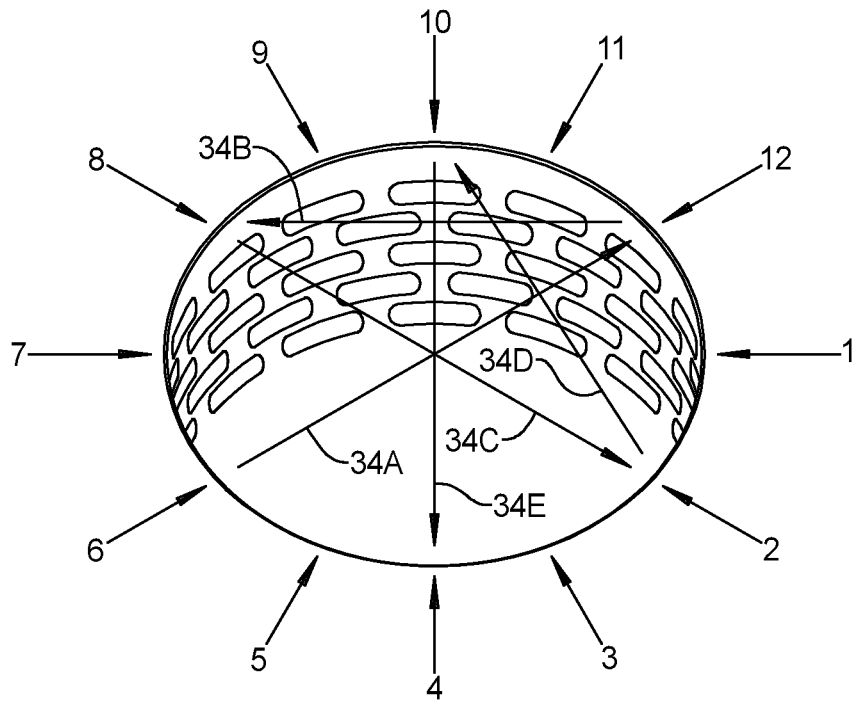
FIG. 5 is a perspective view of a cylinder bore illustrating the twelve positional zones and arrows indicating the movement of the laser head, in a start pattern, through the second plurality of positional zones.

Referring to FIG. 2 and FIG. 3, in an exemplary embodiment, each cylinder bore 16 includes a heat treated region, or a localized area 24, that extends circumferentially around the inner surface 26 of the cylinder bore 16. Each cylinder bore 16 includes twelve positional zones 1, 2, 3, 4, 5, 6, 7, 8, 9, 10, 11, 12 extending circumferentially around the inner surface of the cylinder bore. The twelve positional zones 1, 2, 3, 4, 5, 6, 7, 8, 9, 10, 11, 12 are spaced around the inner surface of the cylinder bore like the numbers spaced around the face of a clock. Thus, the first positional zone is positioned at the 1:00 position, the second positional zone is positioned at the 2:00 position, and so on. The first positional zone 1 of the cylinder bore 16 shown in FIG. 3 is highlighted. Referring to FIG. 4 and FIG. 5, each of the positional zones 1, 2, 3, 4, 5, 6, 7, 8, 9, 10, 11, 12 are shown spaced about the cylinder bore 16.

Figure 6:
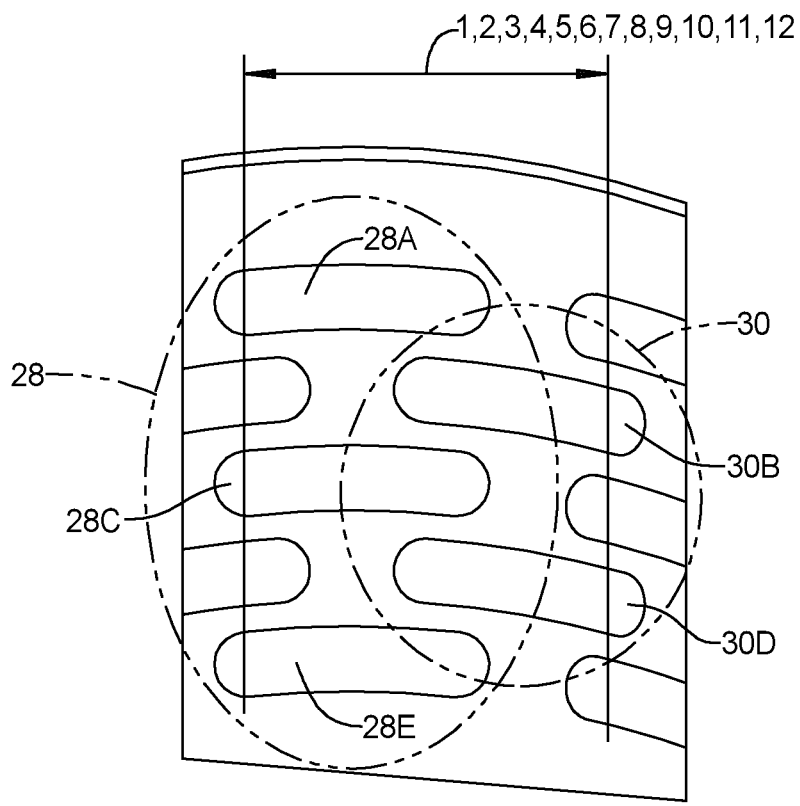
FIG. 6 is an enlarged view of a five pill heat treat pattern and a first plurality of discrete hardened pills and a second plurality of discrete hardened pills.

Referring again to FIG. 3 and to FIG. 6, each positional zone includes a 5-pill heat treatment pattern formed therein. Points of heat treatment are created in a discrete pill shape. Each 5-pill heat treatment pattern comprises a first plurality of discrete hardened pills 28 and a second plurality of discrete hardened pills 30. In an exemplary embodiment, the first plurality of discrete hardened pills 28 within each positional zone 1, 2, 3, 4, 5, 6, 7, 8, 9, 10, 11, 12 of each cylinder bore 16 includes a first discrete hardened pill 28A, a third discrete hardened pill 28C and a fifth discrete hardened pill 28E, and the second plurality of discrete hardened pills 30 within each positional zone 1, 2, 3, 4, 5, 6, 7, 8, 9, 10, 11, 12 of each cylinder bore 16 includes a second discrete hardened pill 30B and a fourth discrete hardened pill 30D.

The controller 22 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

The controller 22 is adapted to cause the laser head 20 to move sequentially to each of the plurality of cylinder bores 16 within the engine block 18, for a first pass. The engine block 18 may have any suitable number of cylinder bores 16, such as four cylinder bores 16, six cylinder bores 16 or eight cylinder bores 16, as shown in FIG. 2. The laser head 20 may be a single laser head unit having one laser head, wherein, for an eight cylinder engine, the laser head indexes eight times, sequentially to each of the eight cylinder bores 16. The laser head 20 may be a dual laser head unit having two laser heads, wherein, for an eight cylinder engine, the laser head 20 unit indexes four times, sequentially to two cylinder bores 16 at a time. The laser head 20 may be a four laser head unit having four laser heads, wherein, for an eight cylinder engine, the laser head unit 20 indexes twice, sequentially to four cylinder bores 16 at a time.

During this first pass of the laser head 20 to each of the plurality of cylinder bores 16 within the engine block 18, at each cylinder bore 16, the controller 22 is adapted to cause the laser head 20 to move sequentially, in a star pattern, to each one of a first plurality of positional zones 5, 11, 7, 1, 9, 3 extending circumferentially around the cylinder bore 16. As shown in FIG. 1, in an exemplary embodiment, the laser head 20 is adapted to project a laser beam 31 to the inner surface 26 of the cylinder bore 16 to form the discrete hardened pills 28, 30. Movement of the laser head 20 to the different positional zones 5, 11, 7, 1, 9, 3, 6, 12, 8, 2, 10, 4 is accomplished by rotating the laser head, as indicated by arrow 33, to align the laser beam 31 with the appropriate positional zone 5, 11, 7, 1, 9, 3, 6, 12, 8, 2, 10, 4.

In an exemplary embodiment, the first plurality of positional zones includes the fifth, eleventh, seventh, first, nineth and third positional zones 5, 11, 7, 1, 9, 3. Referring to FIG. 4, the controller 22 causes the laser head 20 to move to the fifth positional zone 5, from the fifth position zone 5 to the eleventh position zone 11, as indicated by arrow 32A, from the eleventh positional zone 11 to the seventh positional zone 7, as indicated by arrow 32B, from the seventh positional zone 7 to the first positional zone 1, as indicated by arrow 32C, from the first positional zone 1 to the nineth positional zone 9, as indicated by arrow 32D, and from the nineth positional zone 9 to the third positional zone 3, as indicated by arrow 32E.

The controller 22 is further adapted to, at each one of the first plurality of positional zones 5, 11, 7, 1, 9, 3, cause the laser head to create, sequentially, one at a time, a first plurality of discrete hardened pills 28 therein. Thus, while the laser head 20 is positioned at each one of the first plurality of positional zones 5, 11, 7, 1, 9, 3, the controller 22 is adapted to cause the laser head 20 to create, sequentially in order and one at a time, a first discrete hardened pill 28A, a third discrete hardened pill 28C and a fifth discrete hardened pill 28E.

The controller 22 is then adapted to cause the laser head 20 to move sequentially to each of the plurality of cylinder bores within the engine, for a second pass.

During this second pass of the laser head 20 to each of the plurality of cylinder bores 16 within the engine block 18, at each cylinder bore 16, the controller 22 is adapted to cause the laser head 20 to move sequentially, in a star pattern, to each one of the first plurality of positional zones 5, 11, 7, 1, 9, 3 extending circumferentially around the cylinder bore 16, as shown in FIG. 4.

The controller 22 is further adapted to, at each one of the first plurality of positional zones 5, 11, 7, 1, 9, 3, cause the laser head 20 to create, sequentially, one at a time, a second plurality of discrete hardened pills 30 therein. Thus, while the laser head 20 is positioned at each one of the first plurality of positional zones 5, 11, 7, 1, 9, 3, the controller 22 is adapted to cause the laser head 20 to create, sequentially in order and one at a time, a second discrete hardened pill 30B, and a fourth discrete hardened pill 30D.

The controller 22 is then adapted to cause the laser head 20 to move sequentially to each of the plurality of cylinder bores 16 within the engine block 18, for a third pass.

During this third pass of the laser head 20 to each of the plurality of cylinder bores 16 within the engine block 18, at each cylinder bore 16, the controller 22 is adapted to cause the laser head 20 to move sequentially, in a star pattern, to each one of a second plurality of positional zones 6, 12, 8, 2, 10, 4 extending circumferentially around the cylinder bore 16. In an exemplary embodiment, the second plurality of positional zones includes the sixth, twelfth, eighth, second, tenth and fourth positional zones 6, 12, 8, 2, 10, 4. Referring to FIG. 5, the controller 22 causes the laser head 20 to move to the sixth positional zone 6, from the sixth position zone 6 to the twelfth position zone 12, as indicated by arrow 34A, from the twelfth positional zone 12 to the eighth positional zone 8, as indicated by arrow 34B, from the eighth positional zone 8 to the second positional zone 2, as indicated by arrow 34C, from the second positional zone 2 to the tenth positional zone 10, as indicated by arrow 34D, and from the tenth positional zone 10 to the fourth positional zone 4, as indicated by arrow 34E.

The controller 22 is further adapted to, at each one of the second plurality of positional zones 6, 12, 8, 2, 10, 4, cause the laser head 20 to create, sequentially, one at a time, the first plurality of discrete hardened pills 28 therein. Thus, while the laser head 20 is positioned at each one of the second plurality of positional zones 6, 12, 8, 2, 10, 4, the controller 22 is adapted to cause the laser head 20 to create, sequentially in order and one at a time, a first discrete hardened pill 28A, a third discrete hardened pill 28C and a fifth discrete hardened pill 28E.

The controller 22 is then adapted to cause the laser head 20 to move sequentially to each of the plurality of cylinder bores 16 within the engine block 18, for a fourth pass.

During this fourth pass of the laser head 20 to each of the plurality of cylinder bores 16 within the engine block 18, at each cylinder bore 16, the controller 22 is adapted to cause the laser head 20 to move sequentially, in a star pattern, to each one of the second plurality of positional zones 6, 12, 8, 2, 10, 4 extending circumferentially around the cylinder bore 16, as shown in FIG. 5.

The controller 22 is further adapted to, at each one of the second plurality of positional zones 6, 12, 8, 2, 10, 4, cause the laser head 20 to create, sequentially, one at a time, the second plurality of discrete hardened pills 30 therein. Thus, while the laser head 20 is positioned at each one of the second plurality of positional zones 6, 12, 8, 2, 10, 4, the controller 22 is adapted to cause the laser head 20 to create, sequentially in order and one at a time, a second discrete hardened pill 30B and a fourth discrete hardened pill 30D.

Figure 7A:
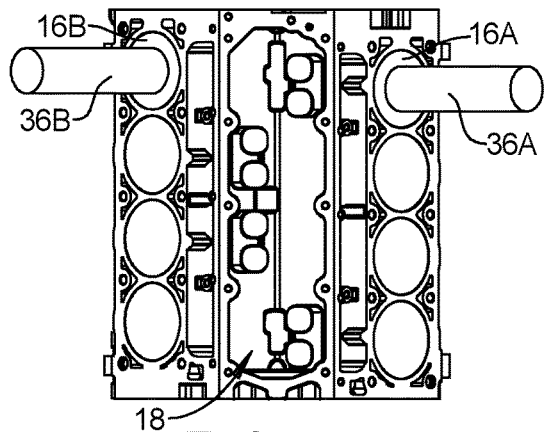
FIG. 7A is a perspective view of an engine block wherein a first laser head is engaged with the first cylinder bore and a second laser head is engaged with the second cylinder bore.
Figure 7B:
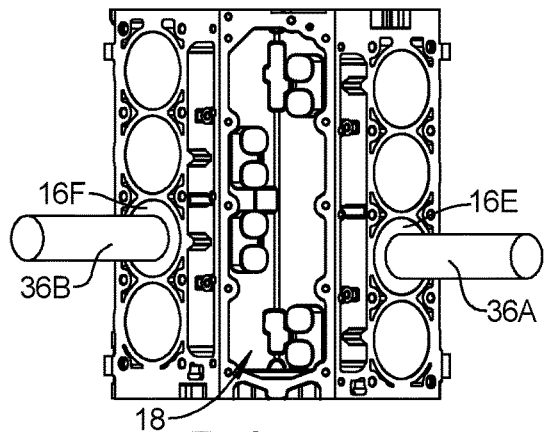
FIG. 7B is a perspective view of the engine block of FIG. 7A, wherein the first laser head is engaged with the fifth cylinder bore and the second laser head is engaged with the sixth cylinder bore.
Figure 7C:
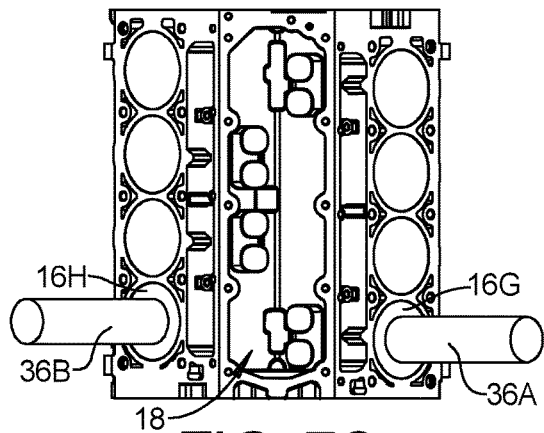
FIG. 7C is a perspective view of the engine block of FIG. 7A, wherein the first laser head is engaged with the seventh cylinder bore and the second laser head is engaged with the eighth cylinder bore.
Figure 7D:
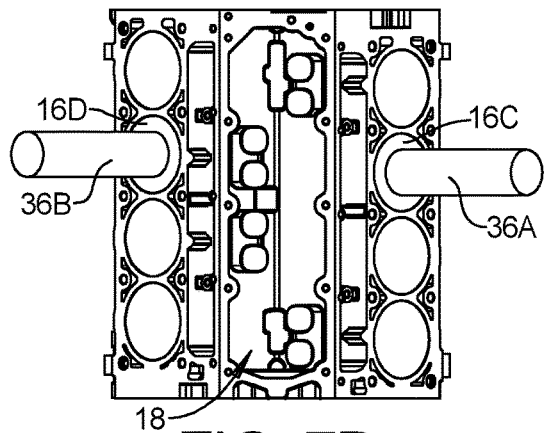
FIG. 7D is a perspective view of the engine block of FIG. 7A, wherein the first laser head is engaged with the third cylinder bore and the second laser head is engaged with the fourth cylinder bore.

In an exemplary embodiment, the engine includes eight cylinder bores 16, as shown in FIG. 2, and the laser head 20 is a dual laser head unit having a first laser head 36A and a second laser head 36B. When the controller 22 causes the laser head 20 to move, sequentially to each of the plurality of cylinder bores 16 within the engine block 18, the controller 22 is further adapted to cause the dual laser head unit to move such that a first laser head 36A is engaged with a first cylinder bore 16A and a second laser head 36B is engaged with a second cylinder bore 16B, as shown in FIG. 7A. Then, the controller 22 is adapted to cause the dual laser head unit to move such that the first laser head 36A is engaged with a fifth cylinder bore 16E and the second laser head 36B is engaged with a sixth cylinder bore 16F, as shown in FIG. 7B. Then, the controller 22 is adapted to cause the dual laser head unit to move such that the first laser head 36A is engaged with a seventh cylinder bore 16G and the second laser head 36B is engaged with an eighth cylinder bore 16H, as shown in FIG. 7C. Finally, the controller 22 is adapted to cause the dual laser head unit to move such that the first laser head 36A is engaged with a third cylinder bore 16C and the second laser head 36B is engaged with a fourth cylinder bore 16D, as shown in FIG. 7D.

Table A below summarizes the process steps of creating the discrete hardened pills 28A, 28C, 28E, 30B and 30D within each of the first plurality of positional zones 5, 11, 7, 1, 9, 3 of each of the cylinder bores 16 within an eight cylinder engine using a dual laser head unit.

TABLE A

| Cyl. | Pos. Zone | Heat Treatment | Laser rotation & indexing |
|---|---|---|---|
| 1 | 1&2 | 5th | 1st, 3rd, and 5th pills. | Rotate to 11th zone. |
| | 1&2 | 11th | 1st, 3rd, and 5th pills. | Rotate to 7th zone. |
| | 1&2 | 7th | 1st, 3rd, and 5th pills. | Rotate to 1st zone. |
| | 1&2 | 1st | 1st, 3rd, and 5th pills. | Rotate to 9th zone. |
| | 1&2 | 9th | 1st, 3rd, and 5th pills. | Rotate to 3rd zone. |
| | 1&2 | 3rd | 1st, 3rd, and 5th pills. | Index to 5th & 6th cyl. |
| 2 | 5&6 | 5th | 1st, 3rd, and 5th pills. | Rotate to 11th zone. |
| | 5&6 | 11th | 1st, 3rd, and 5th pills. | Rotate to 7th zone. |
| | 5&6 | 7th | 1st, 3rd, and 5th pills. | Rotate to 1st zone. |
| | 5&6 | 1st | 1st, 3rd, and 5th pills. | Rotate to 9th zone. |
| | 5&6 | 9th | 1st, 3rd, and 5th pills. | Rotate to 3rd zone. |
| | 5&6 | 3rd | 1st, 3rd, and 5th pills. | Index to 7th & 8th cyl. |
| 3 | 7&8 | 5th | 1st, 3rd, and 5th pills. | Rotate to 11th zone. |
| | 7&8 | 11th | 1st, 3rd, and 5th pills. | Rotate to 7th zone. |
| | 7&8 | 7th | 1st, 3rd, and 5th pills. | Rotate to 1st zone. |
| | 7&8 | 1st | 1st, 3rd, and 5th pills. | Rotate to 9th zone. |
| | 7&8 | 9th | 1st, 3rd, and 5th pills. | Rotate to 3rd zone. |
| | 7&8 | 3rd | 1st, 3rd, and 5th pills. | Index to 3rd & 4th cyl. |
| 4 | 3&4 | 5th | 1st, 3rd, and 5th pills. | Rotate to 11th zone. |
| | 3&4 | 11th | 1st, 3rd, and 5th pills. | Rotate to 7th zone. |
| | 3&4 | 7th | 1st, 3rd, and 5th pills. | Rotate to 1st zone. |
| | 3&4 | 1st | 1st, 3rd, and 5th pills. | Rotate to 9th zone. |
| | 3&4 | 9th | 1st, 3rd, and 5th pills. | Rotate to 3rd zone. |
| | 3&4 | 3rd | 1st, 3rd, and 5th pills. | Index to 1st & 2nd cyl. |
| 5 | 1&2 | 5th | 2nd and 4th pills. | Rotate to 11th zone. |
| | 1&2 | 11th | 2nd and 4th pills. | Rotate to 7th zone. |
| | 1&2 | 7th | 2nd and 4th pills. | Rotate to 1st zone. |
| | 1&2 | 1st | 2nd and 4th pills. | Rotate to 9th zone. |
| | 1&2 | 9th | 2nd and 4th pills. | Rotate to 3rd zone. |
| | 1&2 | 3rd | 2nd and 4th pills. | Index to 5th & 6th cyl. |
| 6 | 5&6 | 5th | 2nd and 4th pills. | Rotate to 11th zone. |
| | 5&6 | 11th | 2nd and 4th pills. | Rotate to 7th zone. |
| | 5&6 | 7th | 2nd and 4th pills. | Rotate to 1st zone. |
| | 5&6 | 1st | 2nd and 4th pills. | Rotate to 9th zone. |
| | 5&6 | 9th | 2nd and 4th pills. | Rotate to 3rd zone. |
| | 5&6 | 3rd | 2nd and 4th pills. | Index to 7th & 8th cyl. |
| 7 | 7&8 | 5th | 2nd and 4th pills. | Rotate to 11th zone. |
| | 7&8 | 11th | 2nd and 4th pills. | Rotate to 7th zone. |
| | 7&8 | 7th | 2nd and 4th pills. | Rotate to 1st zone. |
| | 7&8 | 1st | 2nd and 4th pills. | Rotate to 9th zone. |
| | 7&8 | 9th | 2nd and 4th pills. | Rotate to 3rd zone. |
| | 7&8 | 3rd | 2nd and 4th pills. | Index to 3rd & 4th cyl. |
| 8 | 3&4 | 5th | 2nd and 4th pills. | Rotate to 11th zone. |
| | 3&4 | 11th | 2nd and 4th pills. | Rotate to 7th zone. |
| | 3&4 | 7th | 2nd and 4th pills. | Rotate to 1st zone. |
| | 3&4 | 1st | 2nd and 4th pills. | Rotate to 9th zone. |
| | 3&4 | 9th | 2nd and 4th pills. | Rotate to 3rd zone. |
| | 3&4 | 3rd | 2nd and 4th pills. | Index to 1st & 2nd cyl. |

Table B below summarizes the process steps of creating the discrete hardened pills within each of the second plurality of positional zones 6, 12, 8, 2, 10, 4 of each of the cylinder bores within an eight cylinder engine using a dual laser head unit.

TABLE B

| | Cyl. | Pos. Zone | Heat Treatment | Laser rotation & indexing |
|---|---|---|---|---|
| 9 | 1&2 | 6th | 1st, 3rd, and 5th pills. | Rotate to 12th zone. |
| | 1&2 | 12th | 1st, 3rd, and 5th pills. | Rotate to 8th zone. |
| | 1&2 | 8th | 1st, 3rd, and 5th pills. | Rotate to 2nd zone. |
| | 1&2 | 2nd | 1st, 3rd, and 5th pills. | Rotate to 10th zone. |
| | 1&2 | 10th | 1st, 3rd, and 5th pills. | Rotate to 4th zone. |
| | 1&2 | 4th | 1st, 3rd, and 5th pills. | Index to 5th & 6th cyl. |
| 10 | 5&6 | 6th | 1st, 3rd, and 5th pills. | Rotate to 12th zone. |
| | 5&6 | 12th | 1st, 3rd, and 5th pills. | Rotate to 8th zone |
| | 5&6 | 8th | 1st, 3rd, and 5th pills. | Rotate to 2nd zone. |
| | 5&6 | 2nd | 1st, 3rd, and 5th pills. | Rotate to 10th zone. |
| | 5&6 | 10th | 1st, 3rd, and 5th pills. | Rotate to 4th zone. |
| | 5&6 | 4th | 1st, 3rd, and 5th pills. | Index to 7th & 8th cyl. |
| 11 | 7&8 | 6th | 1st, 3rd, and 5th pills. | Rotate to 12th zone. |
| | 7&8 | 12th | 1st, 3rd, and 5th pills. | Rotate to 8th zone |
| | 7&8 | 8th | 1st, 3rd, and 5th pills. | Rotate to 2nd zone. |
| | 7&8 | 2nd | 1st, 3rd, and 5th pills. | Rotate to 10th zone. |
| | 7&8 | 10th | 1st, 3rd, and 5th pills. | Rotate to 4th zone. |
| | 7&8 | 4th | 1st, 3rd, and 5th pills. | Index to 3rd & 4th cyl. |
| 12 | 3&4 | 6th | 1st, 3rd, and 5th pills. | Rotate to 12th zone. |
| | 3&4 | 12th | 1st, 3rd, and 5th pills. | Rotate to 8th zone. |
| | 3&4 | 8th | 1st, 3rd, and 5th pills. | Rotate to 2nd zone. |
| | 3&4 | 2nd | 1st, 3rd, and 5th pills. | Rotate to 10th zone. |
| | 3&4 | 10th | 1st, 3rd, and 5th pills. | Rotate to 4th zone. |
| | 3&4 | 4th | 1st, 3rd, and 5th pills. | Index to 1st & 2nd cyl. |
| 13 | 1&2 | 6th | 2nd and 4th pills. | Rotate to 12th zone. |
| | 1&2 | 12th | 2nd and 4th pills. | Rotate to 8th zone. |
| | 1&2 | 8th | 2nd and 4th pills. | Rotate to 2nd zone. |
| | 1&2 | 2nd | 2nd and 4th pills. | Rotate to 10th zone. |
| | 1&2 | 10th | 2nd and 4th pills. | Rotate to 4th zone. |
| | 1&2 | 4th | 2nd and 4th pills. | Index to 5th & 6th cyl. |
| 14 | 5&6 | 6th | 2nd and 4th pills. | Rotate to 12th zone. |
| | 5&6 | 12th | 2nd and 4th pills. | Rotate to 8th zone. |
| | 5&6 | 8th | 2nd and 4th pills. | Rotate to 2nd zone. |
| | 5&6 | 2nd | 2nd and 4th pills. | Rotate to 10th zone. |
| | 5&6 | 10th | 2nd and 4th pills. | Rotate to 4th zone. |
| | 5&6 | 4th | 2nd and 4th pills. | Index to 7th & 8th cyl. |
| 15 | 7&8 | 6th | 2nd and 4th pills. | Rotate to 12th zone. |
| | 7&8 | 12th | 2nd and 4th pills. | Rotate to 8th zone. |
| | 7&8 | 8th | 2nd and 4th pills. | Rotate to 2nd zone. |
| | 7&8 | 2nd | 2nd and 4th pills. | Rotate to 10th zone. |
| | 7&8 | 10th | 2nd and 4th pills. | Rotate to 4th zone. |
| | 7&8 | 4th | 2nd and 4th pills. | Index to 3rd & 4th cyl. |
| 16 | 3&4 | 6th | 2nd and 4th pills. | Rotate to 12th zone. |
| | 3&4 | 12th | 2nd and 4th pills. | Rotate to 8th zone. |
| | 3&4 | 8th | 2nd and 4th pills. | Rotate to 2nd zone. |
| | 3&4 | 2nd | 2nd and 4th pills. | Rotate to 10th zone. |
| | 3&4 | 10th | 2nd and 4th pills. | Rotate to 4th zone. |
| | 3&4 | 4th | 2nd and 4th pills. | |

In an exemplary embodiment, the controller 22 is further adapted to cause the dual laser head unit to move such that the first laser head 36A is engaged with the first cylinder bore 16A and the second laser head 36B is engaged with the second cylinder bore 16B, as shown in FIG. 7A, and to cause the first and second laser heads 36A, 36B to move, sequentially, starting at the fifth positional zone 5, to the eleventh 11, seventh 7, first 1, ninth 9, third 3, sixth 6, twelfth 12, eighth 8, second 2, tenth 10 and fourth 4 positional zones within each of the first and second cylinder bores 16A, 16B.

At each of the fifth, eleventh, seventh, first, ninth, third, sixth, twelfth, eighth, second, tenth and fourth positional zones 5, 11, 7, 1, 9, 3, 6, 12, 8, 2, 10, 4 within each of the first and second cylinder bores 16A, 16B, the controller 22 is adapted to cause the first and second laser heads 36A, 36B to simultaneously temper each of the first and second plurality of discrete hardened pills 28, 30.

The controller 22 is further adapted to then cause the dual laser head unit to move such that the first laser head 36A is engaged with the fifth cylinder bore 16E and the second laser head 36B is engaged with the sixth cylinder bore 16F, as shown in FIG. 7B, and to cause the first and second laser heads 36A, 36B to move, sequentially, starting at the fifth positional zone 5, to the eleventh 11, seventh 7, first 1, ninth 9, third 3, sixth 6, twelfth 12, eighth 8, second 2, tenth 10 and fourth 4 positional zones within each of the fifth and sixth cylinder bores 16E, 16F.

At each of the fifth, eleventh, seventh, first, ninth, third, sixth, twelfth, eighth, second, tenth and fourth positional zones 5, 11, 7, 1, 9, 3, 6, 12, 8, 2, 10, 4 within each of the fifth and sixth cylinder bores 16E, 16F, the controller 22 is adapted to cause the first and second laser heads 36A, 36B to simultaneously temper each of the first and second plurality of discrete hardened pills 28, 30.

The controller 22 is further adapted to then cause the dual laser head unit to move such that the first laser head 36A is engaged with the seventh cylinder bore 16G and the second laser head 36B is engaged with the eighth cylinder bore 16H, as shown in FIG. 7C, and to cause the first and second laser heads 36A, 36B to move, sequentially, starting at the fifth positional zone 5, to the eleventh 11, seventh 7, first 1, ninth 9, third 3, sixth 6, twelfth 12, eighth 8, second 2, tenth 10 and fourth 4 positional zones within each of the seventh and eighth cylinder bores 16G, 16H.

At each of the fifth, eleventh, seventh, first, ninth, third, sixth, twelfth, eighth, second, tenth and fourth positional zones 5, 11, 7, 1, 9, 3, 6, 12, 8, 2, 10, 4 within each of the seventh and eighth cylinder bores 16G, 16H, the controller 22 is adapted to cause the first and second laser heads 36A, 36B to simultaneously temper each of the first and second plurality of discrete hardened pills 28, 30.

The controller 22 is further adapted to then cause the dual laser head unit to move such that the first laser head 36A is engaged with the third cylinder bore 16C and the second laser head 36B is engaged with the fourth cylinder bore 16D, as shown in FIG. 7D, and to cause the first and second laser heads 36A, 36B to move, sequentially, starting at the fifth positional zone 5, to the eleventh 11, seventh 7, first 1, ninth 9, third 3, sixth 6, twelfth 12, eighth 8, second 2, tenth 10 and fourth 4 positional zones within each of the third and fourth cylinder bores 16C, 16D.

At each of the fifth, eleventh, seventh, first, ninth, third, sixth, twelfth, eighth, second, tenth and fourth positional zones 5, 11, 7, 1, 9, 3, 6, 12, 8, 2, 10, 4 within each of the third and fourth cylinder bores 16C, 16D, the controller 22 is adapted to cause the first and second laser heads 36A, 36B to simultaneously temper each of the first and second plurality of discrete hardened pills 28, 30.

Table C below summarizes the process steps of tempering the discrete hardened pills within each of the positional zones 5, 11, 7, 1, 9, 3, 6, 12, 8, 2, 10, 4 of each of the cylinder bores 16 within an eight cylinder engine using a dual laser head unit.

TABLE C

| | Cyl. | Pos. Zone | Tempering | Laser rotation & indexing |
|---|---|---|---|---|
| 17 | 1&2 | 5th | 1st thru 5th pills. | Rotate to 11th zone. |
| | 1&2 | 11th | 1st thru 5th pills. | Rotate to 7th zone. |
| | 1&2 | 7th | 1st thru 5th pills. | Rotate to 1st zone. |
| | 1&2 | 1st | 1st thru 5th pills. | Rotate to 9th zone. |
| | 1&2 | 9th | 1st thru 5th pills. | Rotate to 3rd zone. |
| | 1&2 | 3rd | 1st thru 5th pills. | Rotate to 6th zone. |
| 18 | 1&2 | 6th | 1st thru 5th pills. | Rotate to 12th zone. |
| | 1&2 | 12th | 1st thru 5th pills. | Rotate to 8th zone. |

TABLE C-continued

| Cyl. | Pos. Zone | Tempering | Laser rotation & indexing |
|---|---|---|---|
| | 1&2 | 8th | 1st thru 5th pills. | Rotate to 2nd zone. |
| | 1&2 | 2nd | 1st thru 5th pills. | Rotate to 10th zone. |
| | 1&2 | 10th | 1st thru 5th pills. | Rotate to 4th zone. |
| | 1&2 | 4th | 1st thru 5th pills. | Index to 5th & 6th cyl. |
| 19 | 5&6 | 5th | 1st thru 5th pills. | Rotate to 11th zone. |
| | 5&6 | 11th | 1st thru 5th pills. | Rotate to 7th zone. |
| | 5&6 | 7th | 1st thru 5th pills. | Rotate to 1st zone. |
| | 5&6 | 1st | 1st thru 5th pills. | Rotate to 9th zone. |
| | 5&6 | 9th | 1st thru 5th pills. | Rotate to 3rd zone. |
| | 5&6 | 3rd | 1st thru 5th pills. | Rotate to 6th zone. |
| 20 | 5&6 | 6th | 1st thru 5th pills. | Rotate to 12th zone. |
| | 5&6 | 12th | 1st thru 5th pills. | Rotate to 8th zone. |
| | 5&6 | 8th | 1st thru 5th pills. | Rotate to 2nd zone. |
| | 5&6 | 2nd | 1st thru 5th pills. | Rotate to 10th zone. |
| | 5&6 | 10th | 1st thru 5th pills. | Rotate to 4th zone. |
| | 5&6 | 4th | 1st thru 5th pills. | Index to 7th & 8th cyl. |
| 21 | 7&8 | 5th | 1st thru 5th pills. | Rotate to 11th zone. |
| | 7&8 | 11th | 1st thru 5th pills. | Rotate to 7th zone. |
| | 7&8 | 7th | 1st thru 5th pills. | Rotate to 1st zone. |
| | 7&8 | 1st | 1st thru 5th pills. | Rotate to 9th zone. |
| | 7&8 | 9th | 1st thru 5th pills. | Rotate to 3rd zone. |
| | 7&8 | 3rd | 1st thru 5th pills. | Rotate to 6th zone. |
| 22 | 7&8 | 6th | 1st thru 5th pills. | Rotate to 12th zone. |
| | 7&8 | 12th | 1st thru 5th pills. | Rotate to 8th zone. |
| | 7&8 | 8th | 1st thru 5th pills. | Rotate to 2nd zone. |
| | 7&8 | 2nd | 1st thru 5th pills. | Rotate to 10th zone. |
| | 7&8 | 10th | 1st thru 5th pills. | Rotate to 4th zone. |
| | 7&8 | 4th | 1st thru 5th pills. | Index to 3rd & 4th cyl. |
| 23 | 3&4 | 5th | 1st thru 5th pills. | Rotate to 11th zone. |
| | 3&4 | 11th | 1st thru 5th pills. | Rotate to 7th zone. |
| | 3&4 | 7th | 1st thru 5th pills. | Rotate to 1st zone. |
| | 3&4 | 1st | 1st thru 5th pills. | Rotate to 9th zone. |
| | 3&4 | 9th | 1st thru 5th pills. | Rotate to 3rd zone. |
| | 3&4 | 3rd | 1st thru 5th pills. | Rotate to 6th zone. |
| 24 | 3&4 | 6th | 1st thru 5th pills. | Rotate to 12th zone. |
| | 3&4 | 12th | 1st thru 5th pills. | Rotate to 8th zone. |
| | 3&4 | 8th | 1st thru 5th pills. | Rotate to 2nd zone. |
| | 3&4 | 2nd | 1st thru 5th pills. | Rotate to 10th zone. |
| | 3&4 | 10th | 1st thru 5th pills. | Rotate to 4th zone. |
| | 3&4 | 4th | 1st thru 5th pills. | |

Figure 8A:
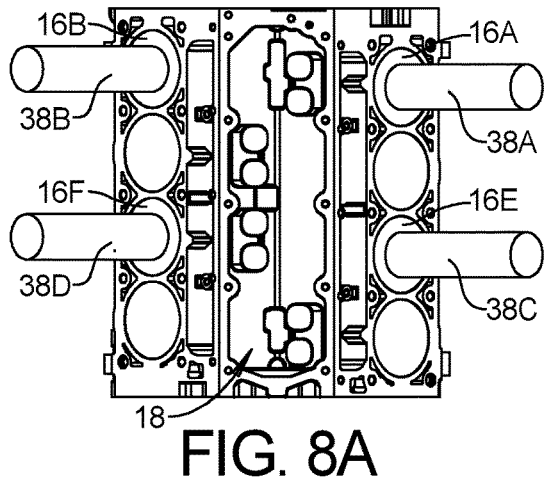
FIG. 8A is a perspective view of an engine block wherein a first laser head is engaged with the first cylinder bore, a second laser head is engaged with the second cylinder bore, a third laser head is engaged with the fifth cylinder bore, and a fourth laser head is engaged with the sixth cylinder bore.
Figure 8B:
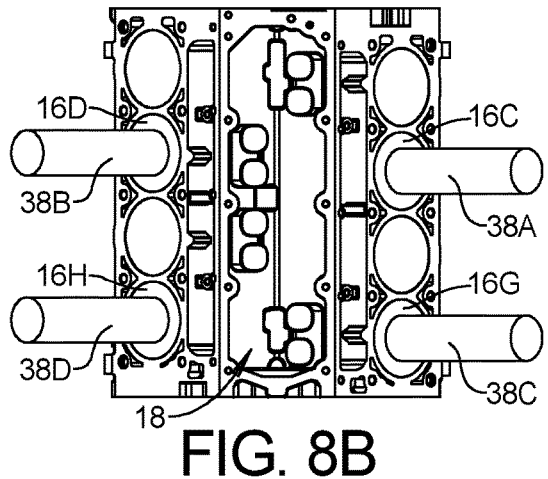
FIG. 8B is a perspective view of the engine block shown in FIG. 8A, wherein the first laser head is engaged with the third cylinder bore, the second laser head is engaged with the fourth cylinder bore, the third laser head is engaged with the seventh cylinder bore, and the fourth laser head is engaged with the eighth cylinder bore.

In an exemplary embodiment, the engine block 18 includes eight cylinder bores, as shown in FIG. 2, and the laser head 20 is a four laser head unit having a first laser head 38A, a second laser head 38B, a third laser head 38C and a fourth laser head 38D. When the controller 22 causes the laser head 20 to move, sequentially to each of the plurality of cylinder bores 16 within the engine block 18, the controller 22 is further adapted to cause the four laser head unit to move such that the first laser head 38A is engaged with the first cylinder bore 16A, the second laser head 38B is engaged with the second cylinder bore 16B, the third laser head 38C is engaged with the fifth cylinder bore 16E and the fourth laser head 38D is engaged with the sixth cylinder bore 16F, as shown in FIG. 8A. Then, the controller 22 is adapted to cause the dual laser head unit to move such that the first laser head 38A is engaged with the third cylinder bore 16C, the second laser head 38B is engaged with the fourth cylinder bore 16D, the third laser head 38C is engaged with the seventh cylinder bore 16G and the fourth laser head 38D is engaged with the eighth cylinder bore 16H, as shown in FIG. 8B. The first and third laser heads 38A, 38C index from the first and fifth cylinder bores 16A, 16E, on the "odd side" of the engine block 18 respectively, to the third and seventh cylinder bores 16C, 16G, on the "odd side" of the engine block 18, and the second and fourth laser heads 38B, 38D index from the second and sixth cylinder bores 16B, 16F, on the "even side" of the engine block 18 respectively, to the fourth and eighth cylinder bores 16D, 16H, on the "even side" of the engine block 18.

Table D below summarizes the process steps of creating the discrete hardened pills 28, 30 within each of the positional zones 5, 11, 7, 1, 9, 3, 6, 12, 8, 2, 10, 4 of each of the cylinder bores 16 within an eight cylinder engine using a four laser head unit.

TABLE D

| Cyl. | Pos. Zone | Heat Treatment | Laser rotation & indexing |
|---|---|---|---|
| 1 | 1, 2, 5, & 6 | 5th | 1st, 3rd, and 5th pills. | Rotate to 11th zone. |
| | 1, 2, 5, & 6 | 11th | 1st, 3rd, and 5th pills. | Rotate to 7th zone. |
| | 1, 2, 5, & 6 | 7th | 1st, 3rd, and 5th pills. | Rotate to 1st zone. |
| | 1, 2, 5, & 6 | 1st | 1st, 3rd, and 5th pills. | Rotate to 9th zone. |
| | 1, 2, 5, & 6 | 9th | 1st, 3rd, and 5th pills. | Rotate to 3rd zone. |
| | 1, 2, 5, & 6 | 3rd | 1st, 3rd, and 5th pills. | Index to 3rd, 4th, 7th & 8th cyl. |
| 2 | 3, 4, 7 & 8 | 5th | 1st, 3rd, and 5th pills. | Rotate to 11th zone. |
| | 3, 4, 7 & 8 | 11th | 1st, 3rd, and 5th pills. | Rotate to 7th zone. |
| | 3, 4, 7 & 8 | 7th | 1st, 3rd, and 5th pills. | Rotate to 1st zone. |
| | 3, 4, 7 & 8 | 1st | 1st, 3rd, and 5th pills. | Rotate to 9th zone. |
| | 3, 4, 7 & 8 | 9th | 1st, 3rd, and 5th pills. | Rotate to 3rd zone. |
| | 3, 4, 7 & 8 | 3rd | 1st, 3rd, and 5th pills. | Index to 1st, 2nd, 5th & 6th cyl. |
| 3 | 1, 2, 5, & 6 | 5th | 2nd and 4th pills. | Rotate to 11th zone. |
| | 1, 2, 5, & 6 | 11th | 2nd and 4th pills. | Rotate to 7th zone. |
| | 1, 2, 5, & 6 | 7th | 2nd and 4th pills. | Rotate to 1st zone. |
| | 1, 2, 5, & 6 | 1st | 2nd and 4th pills. | Rotate to 9th zone. |
| | 1, 2, 5, & 6 | 9th | 2nd and 4th pills. | Rotate to 3rd zone. |
| | 1, 2, 5, & 6 | 3rd | 2nd and 4th pills. | Index to 3rd, 4th, 7th & 8th cyl. |
| 4 | 3, 4, 7 & 8 | 5th | 2nd and 4th pills. | Rotate to 11th zone. |
| | 3, 4, 7 & 8 | 11th | 2nd and 4th pills. | Rotate to 7th zone. |
| | 3, 4, 7 & 8 | 7th | 2nd and 4th pills. | Rotate to 1st zone. |
| | 3, 4, 7 & 8 | 1st | 2nd and 4th pills. | Rotate to 9th zone. |
| | 3, 4, 7 & 8 | 9th | 2nd and 4th pills. | Rotate to 3rd zone. |
| | 3, 4, 7 & 8 | 3rd | 2nd and 4th pills. | Index to 1st, 2nd, 5th & 6th cyl. |
| 5 | 1, 2, 5, & 6 | 6th | 1st, 3rd, and 5th pills. | Rotate to 12th zone. |
| | 1, 2, 5, & 6 | 12th | 1st, 3rd, and 5th pills. | Rotate to 8th zone. |
| | 1, 2, 5, & 6 | 8th | 1st, 3rd, and 5th pills. | Rotate to 2nd zone. |
| | 1, 2, 5, & 6 | 2nd | 1st, 3rd, and 5th pills. | Rotate to 10th zone. |
| | 1, 2, 5, & 6 | 10th | 1st, 3rd, and 5th pills. | Rotate to 4th zone. |
| | 1, 2, 5, & 6 | 4th | 1st, 3rd, and 5th pills. | Index to 3rd, 4th, 7th & 8th cyl. |
| 6 | 3, 4, 7 & 8 | 6th | 1st, 3rd, and 5th pills. | Rotate to 12th zone. |
| | 3, 4, 7 & 8 | 12th | 1st, 3rd, and 5th pills. | Rotate to 8th zone. |
| | 3, 4, 7 & 8 | 8th | 1st, 3rd, and 5th pills. | Rotate to 2nd zone. |
| | 3, 4, 7 & 8 | 2nd | 1st, 3rd, and 5th pills. | Rotate to 10th zone. |
| | 3, 4, 7 & 8 | 10th | 1st, 3rd, and 5th pills. | Rotate to 4th zone. |
| | 3, 4, 7 & 8 | 4th | 1st, 3rd, and 5th pills. | Index to 1st, 2nd, 5th & 6th cyl. |
| 7 | 1, 2, 5, & 6 | 6th | 2nd and 4th pills. | Rotate to 12th zone. |
| | 1, 2, 5, & 6 | 12th | 2nd and 4th pills. | Rotate to 8th zone. |
| | 1, 2, 5, & 6 | 8th | 2nd and 4th pills. | Rotate to 2nd zone. |
| | 1, 2, 5, & 6 | 2nd | 2nd and 4th pills. | Rotate to 10th zone. |
| | 1, 2, 5, & 6 | 10th | 2nd and 4th pills. | Rotate to 4th zone. |
| | 1, 2, 5, & 6 | 4th | 2nd and 4th pills. | Index to 3rd, 4th, 7th & 8th cyl. |
| 8 | 3, 4, 7 & 8 | 6th | 2nd and 4th pills. | Rotate to 12th zone. |
| | 3, 4, 7 & 8 | 12th | 2nd and 4th pills. | Rotate to 8th zone. |
| | 3, 4, 7 & 8 | 8th | 2nd and 4th pills. | Rotate to 2nd zone. |
| | 3, 4, 7 & 8 | 2nd | 2nd and 4th pills. | Rotate to 10th zone. |
| | 3, 4, 7 & 8 | 10th | 2nd and 4th pills. | Rotate to 4th zone. |
| | 3, 4, 7 & 8 | 4th | 2nd and 4th pills. | |

In an exemplary embodiment, the controller 22 is further adapted to cause the four laser head unit to move such that the first laser head 38A is engaged with the first cylinder bore 16A, the second laser head 38B is engaged with the second cylinder bore 16B, the third laser head 38C is engaged with the fifth cylinder bore 16E and the fourth laser head 38D is engaged with the sixth cylinder bore 16F. The controller 22 is further adapted to cause the first, second, third and fourth laser heads 38A, 38B, 38C, 38D to move, sequentially, starting at the fifth positional zone 5, to the eleventh 11, seventh 7, first 1, ninth 9, third 3, sixth 6, twelfth 12, eighth 8, second 2, tenth 10 and fourth 4 positional zones within each of the first, second, fifth and sixth cylinder bores 16A, 16B, 16E, 16F.

At each one of the fifth, eleventh, seventh, first, ninth, third, sixth, twelfth, eighth, second, tenth and fourth positional zones 5, 11, 7, 1, 9, 3, 6, 12, 8, 2, 10, 4 within each of the first, second, fifth and sixth cylinder bores 16A, 16B, 16E, 16F, the controller is adapted to cause the first, second, third and fourth laser heads to simultaneously temper each of the first and second plurality of discrete hardened pills therein.

The controller 22 is further adapted to then cause the four laser head unit to move such that the first laser head 38A is engaged with the third cylinder bore 16C, the second laser head 38B is engaged with the fourth cylinder bore 16D, the third laser head 38C is engaged with the seventh cylinder bore 16G and the fourth laser head 38D is engaged with the eighth cylinder bore 16H. The controller 22 is further adapted to then cause the first, second, third and fourth laser heads 38A, 38B, 38C, 38D to move, sequentially, starting at the fifth positional zone 5, to the eleventh 11, seventh 7, first 1, ninth 9, third 3, sixth 6, twelfth 12, eighth 8, second 2, tenth 10 and fourth 4 positional zones within the third, fourth, seventh and eighth cylinder bores 16C, 16D, 16G, 16H.

At each one of the fifth, eleventh, seventh, first, ninth, third, sixth, twelfth, eighth, second, tenth and fourth positional zones 5, 11, 7, 1, 9, 3, 6, 12, 8, 2, 10, 4 within each of the third, fourth, seventh and eighth cylinder bores 16C, 16D, 16G, 16H, the controller 22 is adapted to cause the first, second, third and fourth laser heads 38A, 38B, 38C, 38D to simultaneously temper each of the first and second plurality of discrete hardened pills 28, 30.

Table E below summarizes the process steps of tempering the discrete hardened pills 28, 30 within each of the positional zones 5, 11, 7, 1, 9, 3, 6, 12, 8, 2, 10, 4 of each of the cylinder bores 16 within an eight cylinder engine using a four laser head unit.

TABLE E

| | Cyl. | Pos. Zone | Tempering | Laser rotation & indexing |
|---|---|---|---|---|
| 9 | 1, 2, 5, & 6 | 5th | 1st thru 5th pills. | Rotate to 11th zone. |
| | 1, 2, 5, & 6 | 11th | 1st thru 5th pills. | Rotate to 7th zone. |
| | 1, 2, 5, & 6 | 7th | 1st thru 5th pills. | Rotate to 1st zone. |
| | 1, 2, 5, & 6 | 1st | 1st thru 5th pills. | Rotate to 9th zone. |
| | 1, 2, 5, & 6 | 9th | 1st thru 5th pills. | Rotate to 3rd zone. |
| | 1, 2, 5, & 6 | 3rd | 1st thru 5th pills. | Rotate to 6th zone. |
| 10 | 1, 2, 5, & 6 | 6th | 1st thru 5th pills. | Rotate to 12th zone. |
| | 1, 2, 5, & 6 | 12th | 1st thru 5th pills. | Rotate to 8th zone. |
| | 1, 2, 5, & 6 | 8th | 1st thru 5th pills. | Rotate to 2nd zone. |
| | 1, 2, 5, & 6 | 2nd | 1st thru 5th pills. | Rotate to 10th zone. |
| | 1, 2, 5, & 6 | 10th | 1st thru 5th pills. | Rotate to 4th zone. |
| | 1, 2, 5, & 6 | 4th | 1st thru 5th pills. | Index to 3rd, 4th, 7th & 8th cyl. |
| 11 | 3, 4, 7 & 8 | 5th | 1st thru 5th pills. | Rotate to 11th zone. |
| | 3, 4, 7 & 8 | 11th | 1st thru 5th pills. | Rotate to 7th zone. |
| | 3, 4, 7 & 8 | 7th | 1st thru 5th pills. | Rotate to 1st zone. |
| | 3, 4, 7 & 8 | 1st | 1st thru 5th pills. | Rotate to 9th zone. |
| | 3, 4, 7 & 8 | 9th | 1st thru 5th pills. | Rotate to 3rd zone. |
| | 3, 4, 7 & 8 | 3rd | 1st thru 5th pills. | Rotate to 6th zone. |
| 12 | 3, 4, 7 & 8 | 6th | 1st thru 5th pills. | Rotate to 12th zone. |
| | 3, 4, 7 & 8 | 12th | 1st thru 5th pills. | Rotate to 8th zone. |
| | 3, 4, 7 & 8 | 8th | 1st thru 5th pills. | Rotate to 2nd zone. |
| | 3, 4, 7 & 8 | 2nd | 1st thru 5th pills. | Rotate to 10th zone. |
| | 3, 4, 7 & 8 | 10th | 1st thru 5th pills. | Rotate to 4th zone. |
| | 3, 4, 7 & 8 | 4th | 1st thru 5th pills. | |

Figure 9:
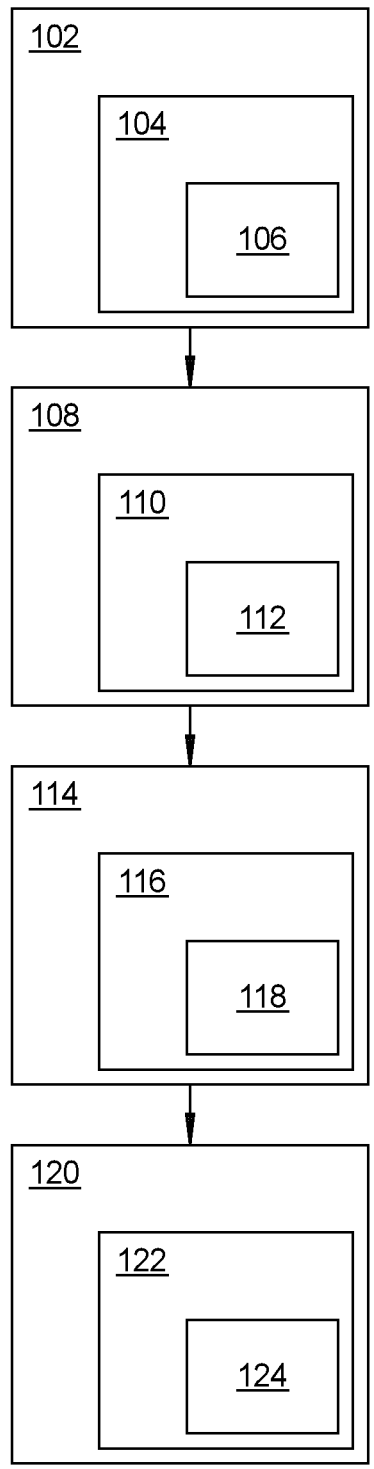
FIG. 9 is a flow chart illustrating a method according to an exemplary embodiment of the present disclosure.

Referring to FIG. 9, a method 100 of heat treating a plurality of cylinder bores 16 within an engine block 18 includes, beginning at block 102, in a first pass, moving a laser head 20, adapted to heat treat a localized area 24 of an inner surface 26 of a cylinder bore 16, sequentially to each of a plurality of cylinder bores 16 within the engine block 18, moving to block 104, at each cylinder bore 16, moving the laser head 20, sequentially, in a star pattern, to each one of a first plurality of positional zones 5, 11, 7, 1, 9, 3 extending circumferentially around the cylinder bore 16, and, moving to block 106, at each one of the first plurality of positional zones 5, 11, 7, 1, 9, 3, creating, with the laser head 20, sequentially, one at a time, a first plurality of discrete hardened pills 28 therein.

Moving to block 108, in a second pass, the method 100 includes moving the laser head 20 sequentially to each of the plurality of cylinder bores 16 within the engine block 18, moving to block 110, at each cylinder bore 16, moving the laser head 20, sequentially, in a star pattern, to each one of a first plurality of positional zones 5, 11, 7, 1, 9, 3 extending circumferentially around the cylinder bore 16, and, moving to block 112, at each one of the first plurality of positional zones 5, 11, 7, 1, 9, 3, creating, with the laser head 20, sequentially, one at a time, a second plurality of discrete hardened pills 30 therein.

Moving to block 114, in a third pass, the method 100 includes moving the laser head 20 sequentially to each of the plurality of cylinder bores 16 within the engine block 18, moving to block 116, at each cylinder bore 16, moving the laser head 20, sequentially, in a star pattern, to each one of a second plurality of positional zones 6, 12, 8, 2, 10, 4 extending circumferentially around the cylinder bore 16, and, moving to block 118, at each one of the second plurality of positional zones 6, 12, 8, 2, 10, 4, creating, with the laser head 20, sequentially, one at a time, a first plurality of discrete hardened pills 28 therein.

Moving to block 120, in a fourth pass, the method 100 includes moving the laser head 20 sequentially to each of the plurality of cylinder bores 16 within the engine block 18, moving to block 122, at each cylinder bore 16, moving the laser head 20, sequentially, in a star pattern, to each one of the second plurality of positional zones 6, 12, 8, 2, 10, 4 extending circumferentially around the cylinder bore 16, and, moving to block 124, at each one of the second plurality of positional zones 6, 12, 8, 2, 10, 4, creating, with the laser head 20, sequentially, one at a time, a second plurality of discrete hardened pills 30 therein.

In an exemplary embodiment, each of the plurality of cylinder bores 16 includes twelve positional zones 5, 11, 7, 1, 9, 3, 6, 12, 8, 2, 10, 4 adjacent one another and extending circumferentially around the cylinder bore 16. The first plurality of positional zones includes first, third, fifth, seventh, ninth and eleventh positional zones 5, 11, 7, 1, 9, 3, and the second plurality of positional zones includes second, fourth, sixth, eighth, tenth and twelfth positional zones 6, 12, 8, 2, 10, 4.

Figure 10:
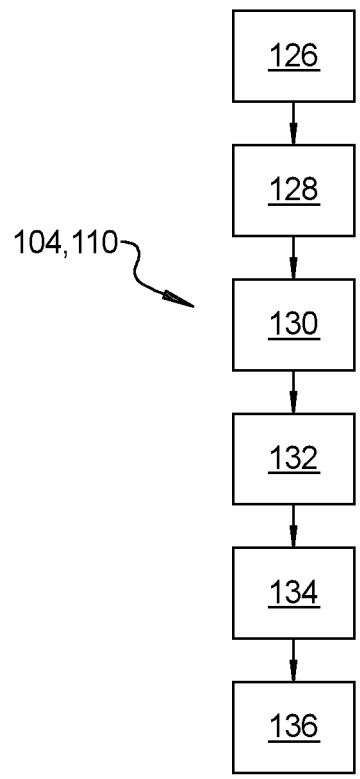
FIG. 10 is a flow chart illustrating details of the movement of the laser head through the first plurality of positional zones, as shown in FIG. 4.

Referring to FIG. 10, the moving the laser head 20, sequentially, in a star pattern, to each one of the first plurality of positional zones 5, 11, 7, 1, 9, 3 extending circumferentially around the cylinder bore 16 at blocks 104 and 110, further includes, moving to block 126, moving the laser head 20 to the fifth positional zone 5, moving to block 128, moving the laser head 20 from the fifth positional zone 5 to the eleventh positional zone 11, moving to block 130, moving the laser head 20 from the eleventh positional zone 11 to the seventh positional zone 7, moving to block 132, moving the laser head 20 from the seventh positional zone 7 to the first positional zone 1, moving to block 134, moving the laser head 20 from the first positional zone 1 to the ninth positional zone 9, and, moving to block 136, moving the laser head 20 from the ninth positional zone 9 to the third positional zone 3.

Figure 11:
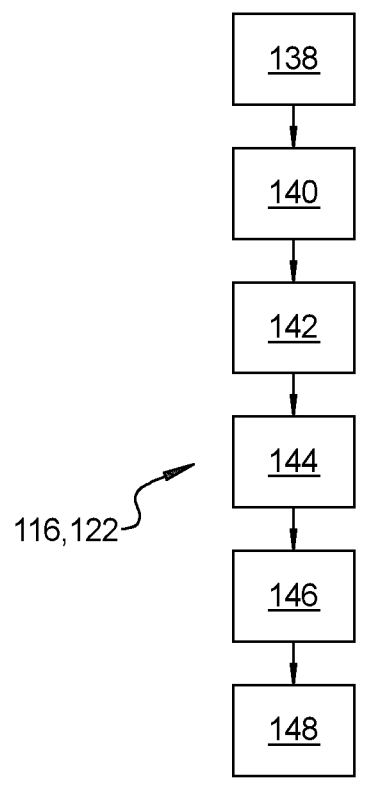
FIG. 11 is a flow chart illustrating details of the movement of the laser head through the first plurality of positional zones, as shown in FIG. 5.

Referring to FIG. 11, the moving the laser head 20, sequentially, in a star pattern, to each one of the first plurality of positional zones 5, 11, 7, 1, 9, 3 extending circumferentially around the cylinder bore 16 at blocks 116 and 122, further includes, moving to block 138, moving the laser head 20 to the sixth positional zone 6, moving to block 140, moving the laser head 20 from the sixth positional zone 6 to the twelfth positional zone 12, moving to block 142, moving the laser head 20 from the twelfth positional zone 12 to the eighth positional zone 8, moving to block 144, moving the laser head 20 from the eighth positional zone 8 to the second positional zone 2, moving to block 146, moving the laser head 20 from the second positional zone 2 to the tenth positional zone 10, and, moving to block 148, moving the laser head 20 from the tenth positional zone 10 to the fourth positional zone 4.

Figure 12:
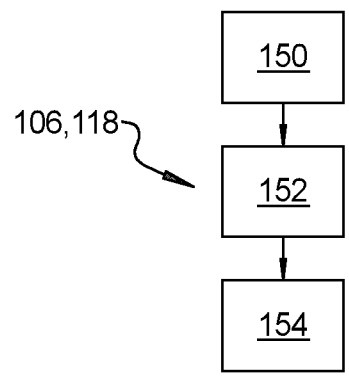
FIG. 12 is a flow chart illustrating the method steps of creating the first plurality of discrete hardened pills within each positional zone of each of the plurality of cylinder bores.
Figure 13:
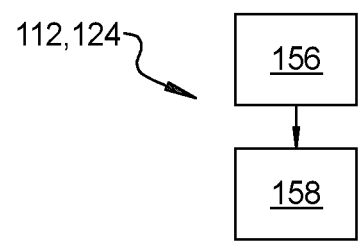
FIG. 13 is a flow chart illustrating the method steps of creating the second plurality of discrete hardened pills within each positional zone of each of the plurality of cylinder bores.

In an exemplary embodiment, the first plurality of discrete hardened pills 28 includes a first pill 28A, a third pill 28C and a fifth pill 28E, and the second plurality of discrete hardened pills 30 includes a second pill 30B and a fourth pill 30D. Referring to FIG. 12, the creating, with the laser head 20, sequentially, one at a time, the first plurality of discrete hardened pills 28 at blocks 106, 118 further includes, moving to block 150, creating, with the laser head 20, the first discrete hardened pill 28A, moving to block 152, creating, with the laser head 20, the third discrete hardened pill 28C, and, moving to block 154, creating, with the laser head 20, the fifth discrete hardened pill 28E. Referring to FIG. 13, the creating, with the laser head 20, sequentially, one at a time, the second plurality of discrete hardened pills 30 at blocks 112, 124 further includes, moving to block 156, creating, with the laser head 20, the second discrete hardened pill 30B, and, moving to block 158, creating, with the laser head 20, the fourth discrete hardened pill 30D.

Figure 14:
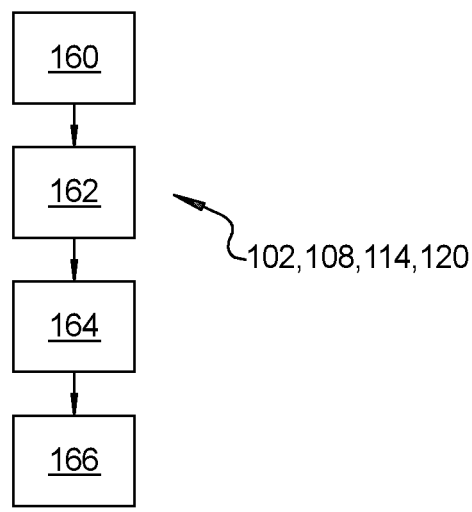
FIG. 14 is a flow chart illustrating additional method steps describing movement of a dual head laser unit through the cylinder bores of an eight cylinder engine block.

In an exemplary embodiment, the engine includes eight cylinder bores 16 and the laser head 20 is a dual laser head unit. Referring to FIG. 14, the moving the laser head 20, adapted to heat treat a localized area 24 of an inner surface 26 of a cylinder bore 16, sequentially to each of the plurality of cylinder bores 16 within the engine at blocks 102, 108, 114 and 120 further includes, moving to block 160, moving the dual laser head unit such that a first laser head 36A is engaged with a first cylinder bore 16A and a second laser head 36B is engaged with a second cylinder bore 16B, moving to block 162, moving the dual laser head unit such that the first laser head 36A is engaged with a fifth cylinder bore 16E and the second laser head 36B is engaged with a sixth cylinder bore 16F, moving to block 164, moving the dual laser head unit such that the first laser head 36A is engaged with a seventh cylinder bore 16G and the second laser head 36B is engaged with an eighth cylinder bore 16H, and, moving to block 166, moving the dual laser head unit such that the first laser head 36A is engaged with a third cylinder bore 16C and the second laser head 36B is engaged with a fourth cylinder bore 16D.

Figure 15:
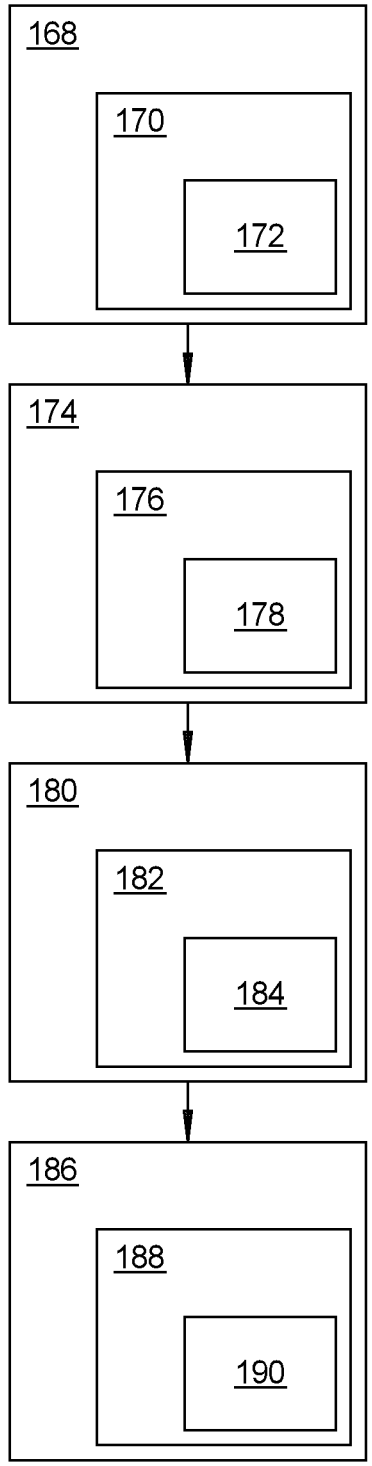
FIG. 15 is a flow chart illustrating additional method steps for tempering of the first and second plurality of discrete hardened pills using a dual head laser unit.

Referring to FIG. 15, In an exemplary embodiment, the method 100 further includes, beginning at block 168, in a first tempering pass, moving the dual laser head unit such that the first laser head 36A is engaged with the first cylinder bore 16A and the second laser head 36B is engaged with the second cylinder bore 16B, moving to block 170, moving the first and second laser heads 36A, 36B, sequentially in order, starting at the fifth positional zone 5, to the eleventh 11, seventh 7, first 1, ninth 9, third 3, sixth 6, twelfth 12, eighth 8, second 2, tenth 10 and fourth 4 positional zones within the first and second cylinder bores 16A, 16B, and, moving to block 172, at each one of the fifth, eleventh, seventh, first, ninth, third, sixth, twelfth, eighth, second, tenth and fourth positional zones 5, 11, 7, 1, 9, 3, 6, 12, 8, 2, 10, 4 within each of the first and second cylinder bores 16A, 16B, simultaneously tempering, with the first and second laser heads 36A, 36B, each of the first and second plurality of discrete hardened pills 28, 30.

Moving to block 174, in a second tempering pass, the method 100 includes moving the dual laser head unit such that the first laser head 36A is engaged with the fifth cylinder bore 16E and the second laser head 36B is engaged with the sixth cylinder bore 16F, moving to block 176, moving the first and second laser heads 36A, 36B, sequentially, starting at the fifth positional zone 5, to the eleventh 11, seventh 7, first 1, ninth 9, third 3, sixth 6, twelfth 12, eighth 8, second 2, tenth 10 and fourth 4 positional zones within the fifth and sixth cylinder bores 16E, 16F, and, moving to block 178, at each one of the fifth, eleventh, seventh, first, ninth and third, sixth, twelfth, eighth, second, tenth and fourth positional zones 5, 11, 7, 1, 9, 3, 6, 12, 8, 2, 10, 4 within each of the fifth and sixth cylinder bores 16E, 16F, simultaneously tempering, with the first and second laser heads 36A, 36B, each of the first and second plurality of discrete hardened pills 28, 30.

Moving to block 180, in a third tempering pass, the method 100 includes moving the dual laser head unit such that the first laser head 36A is engaged with the seventh cylinder bore 16G and the second laser head 36B is engaged with the eighth cylinder bore 16H, moving to block 182, moving the first and second laser heads 36A, 36B, sequentially, starting at the fifth positional zone 5, to the eleventh 11, seventh 7, first 1, ninth 9, third 3, sixth 6, twelfth 12, eighth 8, second 2, tenth 10 and fourth 4 positional zones within the seventh and eighth cylinder bores 16G, 16H, and, moving to block 184, at each one of the fifth, eleventh, seventh, first, ninth, third, sixth, twelfth, eighth, second, tenth and fourth positional zones 5, 11, 7, 1, 9, 3, 6, 12, 8, 2, 10, 4 within each of the seventh and eighth cylinder bores 16G, 16H, simultaneously tempering, with the first and second laser heads 36A, 36B, each of the first and second plurality of discrete hardened pills 28, 30.

Moving to block 186, in a fourth tempering pass, the method 100 includes moving the dual laser head unit such that the first laser head 36A is engaged with the third cylinder bore 16C and the second laser head 36B is engaged with the fourth cylinder bore 16D, moving to block 188, moving the first and second laser heads 36A, 36B, sequentially, starting at the fifth positional zone 5, to the eleventh 11, seventh 7, first 1, ninth 9, third 3, sixth 6, twelfth 12, eighth 8, second 2, tenth 10 and fourth 4 positional zones within the third and fourth cylinder bores 16C, 16D, and, moving to block 190, at each one of the fifth, eleventh, seventh, first, ninth, third, sixth, twelfth, eighth, second, tenth and fourth positional zones 5, 11, 7, 1, 9, 3, 6, 12, 8, 2, 10, 4 within each of the third and fourth cylinder bores 16C, 16D, simultaneously tempering, with the first and second laser heads 36A, 36B, each of the first and second plurality of discrete hardened pills 28, 30.

Figure 16:
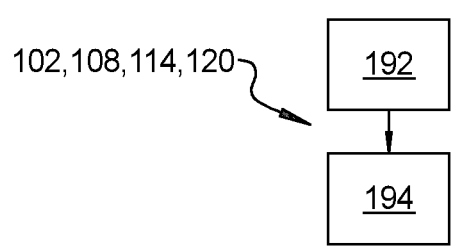
FIG. 16 is a flow chart illustrating additional method steps describing movement of a four head laser unit through the cylinder bores of an eight cylinder engine block.

In another exemplary embodiment, the engine includes eight cylinder bores 16 and the laser head 20 is a four laser head unit. Referring to FIG. 16, the moving the laser head 20, adapted to heat treat a localized area 24 of an inner surface 26 of a cylinder bore 16, sequentially to each of the plurality of cylinder bores 16 within the engine at blocks 102, 108, 114 and 120, further includes, moving to block

192, moving the four laser head unit such that a first laser head 38A is engaged with a first cylinder bore 16A, a second laser head 38B is engaged with a second cylinder bore 16B, a third laser head 38C is engaged with a fifth cylinder bore 16E and a fourth laser head 38D is engaged with a sixth cylinder bore 16F, and, moving to block 194, moving the four laser head unit such that the first laser head 38A is engaged with a third cylinder bore 16C, a second laser head 38B is engaged with a fourth cylinder bore 16D, a third laser head 38C is engaged with a seventh cylinder bore 16G and a fourth laser head 38D is engaged with an eighth cylinder bore 16H.

Figure 17:
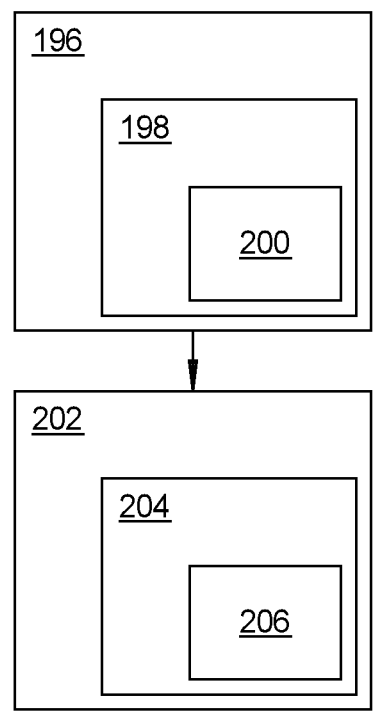
FIG. 17 is a flow chart illustrating additional method steps for tempering of the first and second plurality of discrete hardened pills using a four head laser unit.

Referring to FIG. 17, in another exemplary embodiment, the method 100 further includes, moving to block 196, moving the four laser head unit such that the first laser head 38A is engaged with the first cylinder bore 16A, the second laser head 38B is engaged with the second cylinder bore 16B, the third laser head 38C is engaged with the fifth cylinder bore 16E and the fourth laser head 38D is engaged with the sixth cylinder bore 16F, moving to block 198, moving the first, second, third and fourth laser heads 38A, 38B, 38C, 38D, sequentially, starting at the fifth positional zone 5, to the eleventh 11, seventh 7, first 1, ninth 9, third 3, sixth 6, twelfth 12, eighth 8, second 2, tenth 10 and fourth 4 positional zones within the first, second, fifth and sixth cylinder bores 16A, 16B, 16E, 16F, and, moving to block 200, at each one of the fifth, eleventh, seventh, first, ninth, third, sixth, twelfth, eighth, second, tenth and fourth positional zones 5, 11, 7, 1, 9, 3, 6, 12, 8, 2, 10, 4 within each of the first, second, fifth and sixth cylinder bores 16A, 16B, 16E, 16F, simultaneously tempering, with the first, second, third and fourth laser heads 38A, 38B, 38C, 38D, each of the first and second plurality of discrete hardened pills 28, 30.

Moving to block 202, the method 100 further includes moving the four laser head unit such that the first laser head 38A is engaged with the third cylinder bore 16C, the second laser head 38B is engaged with the fourth cylinder bore 16D, the third laser head 38C is engaged with the seventh cylinder bore 16G and the fourth laser head 38D is engaged with the eighth cylinder bore 16H, moving to block 204, moving the first, second, third and fourth laser heads 38A, 38B, 38C, 38D, sequentially, starting at the fifth positional zone 5, to the eleventh 11, seventh 7, first 5, ninth 9, third 3, sixth 6, twelfth 12, eighth 8, second 2, tenth 10 and fourth 4 positional zones within the third, fourth, seventh and eighth cylinder bores 16C, 16D, 16G, 16H, and, moving to block 206, at each one of the fifth, eleventh, seventh, first, ninth, third, sixth, twelfth, eighth, second, tenth and fourth positional zones 5, 11, 7, 1, 9, 3, 6, 12, 8, 2, 10, 4 within each of the third, fourth, seventh and eighth cylinder bores 16C, 16D, 16G, 16H, simultaneously tempering, with the first, second, third and fourth laser heads 38A, 38B, 38C, 38D, each of the first and second plurality of discrete hardened pills 28, 30.

A laser hardening system and method of the present disclosure minimizes thermal damage during the application of heat by way of laser scanning. The reduction of damage is achieved by distributing the thermal energy more uniformly around the cylindrical hardening zone. This distribution of energy is enabled by the use of a star pattern, where clock positions within the cylinder are lased by jumping across the cylinder bore to the nearly opposite side. The heat signature associated with the five pill patch is further isolated by scanning one discrete pill at a time. Additionally, the five pill patch is lased in two groups, the first including the first plurality of discrete hardened pills (three pills), the second addressing the second plurality of discrete hardened pills (the remaining two pills). Further thermal isolation is achieved by indexing the laser heads to adjacent cylinder bores between groups of patches and groups of pills. This distribution of thermal energy has been shown in simulation to reduce the damage imparted to the cylinder block, especially in the thinnest wall sections.

Interaction among the laser hardening thermal transients and the cylinder block's alternating zones of thick and thin wall sections results in damage which presents as macrocracks after hardening. Current methods of utilizing sequential heating, to essentially pre-heat adjacent regions, contributes to local overheating. Additionally, heating of five adjacent pills simultaneously, to leverage the laser head's capability and the total power available, further overheats and damages thin wall sections of the cylinder bore. The novel approach of forming one pill at a time, and progressing across the bore in a star pattern to separate the thermal signature, is beneficial in assuring case depth development with minimized peak temperatures. This star pattern, accompanied by indexing from one pair of bores to the next allows conduction to utilize mass quenching to pull heat away before an adjacent pill grouping is heated. Odd pill groupings (first plurality of positional zones) correspond to the thin wall sections and are thus heated first in the recipe of the present disclosure. This assures that they will not be subjected to any preheating which could affect thermal damage and martensite quench out. Lastly, a reduced power, shortened time application of the five pill scanning method is used to produce a diffuse thermal field for tempering of the newly formed martensite.

This novel laser scanning heat treat pattern generates discrete hardened pills, where adjacent pill heating has minimal effect. The more uniform distribution of heating results in lower thermally induced damage, especially in the thin wall sections, where cracking is a problem with current processes. Indexing allows for more complete martensitic transformation by way of mass quenching. Pill to pill consistency is improved due to heat treating the pills one at a time. The post-hardening distortion is reduced significantly, and the coaxial hone process benefits from significant reduction in bore distortion. The more targeted heating achieved with single pill heating reduces total cycle time which provides a window of time in which to enact the targeted tempering process within current cycle times.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of heat treating a plurality of cylinder bores within an engine block, comprising:
    moving a laser head, adapted to heat treat a localized area of an inner surface of a cylinder bore, sequentially to each of a plurality of cylinder bores within the engine;
    at each cylinder bore, moving the laser head, sequentially, in a star pattern, to each one of a first plurality of positional zones extending circumferentially around the cylinder bore;
    at each one of the first plurality of positional zones, creating, with the laser head, sequentially, one at a time, a first plurality of discrete hardened pills therein;
    moving the laser head sequentially to each of the plurality of cylinder bores within the engine;

at each cylinder bore, moving the laser head, sequentially, in the star pattern, to each one of the first plurality of positional zones extending circumferentially around the cylinder bore;
at each one of the first plurality of positional zones, creating, with the laser head, sequentially, one at a time, a second plurality of discrete hardened pills therein;
moving the laser head sequentially to each of the plurality of cylinder bores within the engine;
at each cylinder bore, moving the laser head, sequentially, in a star pattern, to each one of a second plurality of positional zones extending circumferentially around the cylinder bore;
at each one of the second plurality of positional zones, creating, with the laser head, sequentially, one at a time, a first plurality of discrete hardened pills therein;
moving the laser head sequentially to each of the plurality of cylinder bores within the engine;
at each cylinder bore, moving the laser head, sequentially, in the star pattern, to each one of the second plurality of positional zones extending circumferentially around the cylinder bore; and
at each one of the second plurality of positional zones, creating, with the laser head, sequentially, one at a time, a second plurality of discrete hardened pills therein.

2. The method of claim 1, wherein each of the plurality of cylinder bores includes twelve positional zones adjacent one another and extending circumferentially around the cylinder bore.

3. The method of claim 2, wherein the first plurality of positional zones includes a first positional zone, a third positional zone, a fifth positional zone, a seventh positional zone, a ninth positional zone and an eleventh positional zone;
wherein, the moving the laser head, sequentially, in the star pattern, to each one of the first plurality of positional zones extending circumferentially around the cylinder bore further includes, moving the laser head, sequentially, starting at the fifth positional zone to the eleventh positional zone, from the eleventh positional zone to the seventh positional zone, from the seventh positional zone to the first positional zone, from the first positional zone to the ninth positional zone, and from the ninth positional zone to the third positional zone.

4. The method of claim 3, wherein the second plurality of positional zones includes a second positional zone, a fourth positional zone, a sixth positional zone, an eighth positional zone, a tenth positional zone and a twelfth positional zone;
wherein, the moving the laser head, sequentially, in the star pattern, to each one of the second plurality of positional zones extending circumferentially around the cylinder bore further includes, moving the laser head, sequentially, starting at the sixth positional zone to the twelfth positional zone, from the twelfth positional zone to the eighth positional zone, from the eighth positional zone to the second positional zone, from the second positional zone to the tenth positional zone, and from the tenth positional zone to the fourth positional zone.

5. The method of claim 4, wherein the first plurality of discrete hardened pills includes a first discrete hardened pill, a third discrete hardened pill and a fifth discrete hardened pill, and the second plurality of discrete hardened pills includes a second discrete hardened pill and a fourth discrete hardened pill.

6. The method of claim 5, wherein the creating, with the laser head, sequentially, one at a time, the first plurality of discrete hardened pills further includes:
creating, with the laser head, the first discrete hardened pill;
creating, with the laser head, the third discrete hardened pill; and
creating, with the laser head, the fifth discrete hardened pill; and
the creating, with the laser head, sequentially, one at a time, the second plurality of discrete hardened pills further includes:
creating, with the laser head, the second discrete hardened pill; and
creating, with the laser head, the fourth discrete hardened pill.

7. The method of claim 6, wherein the engine block includes eight cylinder bores and the laser head is a dual laser head unit;
wherein, the moving the laser head, adapted to heat treat a localized area of an inner surface of a cylinder bore, sequentially to each of the plurality of cylinder bores within the engine further includes:
moving the dual laser head unit such that a first laser head is engaged with a first cylinder bore and a second laser head is engaged with a second cylinder bore;
moving the dual laser head unit such that the first laser head is engaged with a fifth cylinder bore and the second laser head is engaged with a sixth cylinder bore;
moving the dual laser head unit such that the first laser head is engaged with a seventh cylinder bore and the second laser head is engaged with an eighth cylinder bore; and
moving the dual laser head unit such that the first laser head is engaged with a third cylinder bore and the second laser head is engaged with a fourth cylinder bore.

8. The method of claim 7, further including:
moving the dual laser head unit such that the first laser head is engaged with the first cylinder bore and the second laser head is engaged with the second cylinder bore;
moving the first and second laser heads, sequentially, starting at the fifth positional zone, to the eleventh positional zone, the seventh positional zone, the first positional zone, the ninth positional zone, the third positional zone, the sixth positional zone, the twelfth positional zone, the eighth positional zone, the second positional zone, the tenth positional zone and the fourth positional zone within the first and second cylinder bores;
at each one of the fifth, eleventh, seventh, first, ninth and third positional zones within each of the first and second cylinder bores, simultaneously tempering, with the first and second laser heads, each of the first and second plurality of discrete hardened pills; and
at each one of the sixth, twelfth, eighth, second, tenth and fourth positional zones within each of the first and second cylinder bores, simultaneously tempering, with the first and second laser heads, each of the first and second plurality of discrete hardened pills;
moving the dual laser head unit such that the first laser head is engaged with the fifth cylinder bore and the second laser head is engaged with the sixth cylinder bore;

moving the first and second laser heads, sequentially, starting at the fifth positional zone, to the eleventh positional zone, the seventh positional zone, the first positional zone, the ninth positional zone, the third positional zone, the sixth positional zone, the twelfth positional zone, the eighth positional zone, the second positional zone, the tenth positional zone and the fourth positional zone within the fifth and sixth cylinder bores;

at each one of the fifth, eleventh, seventh, first, ninth and third positional zones within each of the fifth and sixth cylinder bores, simultaneously tempering, with the first and second laser heads, each of the first and second plurality of discrete hardened pills;

at each one of the sixth, twelfth, eighth, second, tenth and fourth positional zones within each of the fifth and sixth cylinder bores, simultaneously tempering, with the first and second laser heads, each of the first and second plurality of discrete hardened pills;

moving the dual laser head unit such that the first laser head is engaged with the seventh cylinder bore and the second laser head is engaged with the eighth cylinder bore;

moving the first and second laser heads, sequentially, starting at the fifth positional zone, to the eleventh positional zone, the seventh positional zone, the first positional zone, the ninth positional zone, the third positional zone, the sixth positional zone, the twelfth positional zone, the eighth positional zone, the second positional zone, the tenth positional zone and the fourth positional zone within the seventh and eighth cylinder bores;

at each one of the fifth, eleventh, seventh, first, ninth and third positional zones within each of the seventh and eighth cylinder bores, simultaneously tempering, with the first and second laser heads, each of the first and second plurality of discrete hardened pills;

at each one of the sixth, twelfth, eighth, second, tenth and fourth positional zones within each of the seventh and eighth cylinder bores, simultaneously tempering, with the first and second laser heads, each of the first and second plurality of discrete hardened pills;

moving the dual laser head unit such that the first laser head is engaged with the third cylinder bore and the second laser head is engaged with the fourth cylinder bore;

moving the first and second laser heads, sequentially, starting at the fifth positional zone, to the eleventh positional zone, the seventh positional zone, the first positional zone, the ninth positional zone, the third positional zone, the sixth positional zone, the twelfth positional zone, the eighth positional zone, the second positional zone, the tenth positional zone and the fourth positional zone within the third and fourth cylinder bores;

at each one of the fifth, eleventh, seventh, first, ninth and third positional zones within each of the third and fourth cylinder bores, simultaneously tempering, with the first and second laser heads, each of the first and second plurality of discrete hardened pills; and at each one of the sixth, twelfth, eighth, second, tenth and fourth positional zones within each of the third and fourth cylinder bores, simultaneously tempering, with the first and second laser heads, each of the first and second plurality of discrete hardened pills.

9. The method of claim 6, wherein the engine includes eight cylinder bores and the laser head is a four laser head unit;

wherein, the moving the laser head, adapted to heat treat a localized area of an inner surface of a cylinder bore, sequentially to each of the plurality of cylinder bores within the engine further includes:

moving the four laser head unit such that a first laser head is engaged with a first cylinder bore, a second laser head is engaged with a second cylinder bore, a third laser head is engaged with a fifth cylinder bore and a fourth laser head is engaged with a sixth cylinder bore; and moving the four laser head unit such that a first laser head is engaged with a third cylinder bore, a second laser head is engaged with a fourth cylinder bore, a third laser head is engaged with a seventh cylinder bore and a fourth laser head is engaged with an eighth cylinder bore.

10. The method of claim 9, further including:

moving the four laser head unit such that a first laser head is engaged with a first cylinder bore, a second laser head is engaged with a second cylinder bore, a third laser head is engaged with a fifth cylinder bore and a fourth laser head is engaged with a sixth cylinder bore;

moving the first, second, third and fourth laser heads, sequentially, starting at the fifth positional zone, to the eleventh positional zone, the seventh positional zone, the first positional zone, the ninth positional zone, the third positional zone, the sixth positional zone, the twelfth positional zone, the eighth positional zone, the second positional zone, the tenth positional zone and the fourth positional zone within the first, second, fifth and sixth cylinder bores;

at each one of the fifth, eleventh, seventh, first, ninth and third positional zones within each of the first, second, fifth and sixth cylinder bores, simultaneously tempering, with the first, second, third and fourth laser heads, each of the first and second plurality of discrete hardened pills; and at each one of the sixth, twelfth, eighth, second, tenth and fourth positional zones within each of the first, second, fifth and sixth cylinder bores, simultaneously tempering, with the first, second, third and fourth laser heads, each of the first and second plurality of discrete hardened pills;

moving the four laser head unit such that the first laser head is engaged with a third cylinder bore, the second laser head is engaged with a fourth cylinder bore, the third laser head is engaged with a seventh cylinder bore and the fourth laser head is engaged with an eighth cylinder bore;

moving the first, second, third and fourth laser heads, sequentially, starting at the fifth positional zone, to the eleventh positional zone, the seventh positional zone, the first positional zone, the ninth positional zone, the third positional zone, the sixth positional zone, the twelfth positional zone, the eighth positional zone, the second positional zone, the tenth positional zone and the fourth positional zone within the third, fourth, seventh and eighth cylinder bores;

at each one of the fifth, eleventh, seventh, first, ninth and third positional zones within each of the third, fourth, seventh and eighth cylinder bores, simultaneously tempering, with the first, second, third and fourth laser heads, each of the first and second plurality of discrete hardened pills; and at each one of the sixth, twelfth, eighth, second, tenth and fourth positional zones within each of the third, fourth, seventh and eighth cylinder bores, simultaneously tempering, with the first, second, third and fourth laser heads, each of the first and second plurality of discrete hardened pills.

11. A system for heat treating a plurality of cylinder bores within an engine, comprising:
a laser head adapted to heat treat a localized area of an inner surface of a cylinder bore; and
a controller adapted to:
cause the laser head to move sequentially to each of the plurality of cylinder bores within the engine;
at each cylinder bore, cause the laser head to move sequentially, in a star pattern, to each one of a first plurality of positional zones extending circumferentially around the cylinder bore;
at each one of the first plurality of positional zones, cause the laser head to create, sequentially, one at a time, a first plurality of discrete hardened pills therein;
cause the laser head to move sequentially to each of the plurality of cylinder bores within the engine;
at each cylinder bore, cause the laser head to move, sequentially, in the star pattern, to each one of the first plurality of positional zones extending circumferentially around the cylinder bore;
at each one of the first plurality of positional zones, cause the laser head to create, sequentially, one at a time, a second plurality of discrete hardened pills therein;
cause the laser head to move sequentially to each of the plurality of cylinder bores within the engine;
at each cylinder bore, cause the laser head to move, sequentially, in a star pattern, to each one of a second plurality of positional zones extending circumferentially around the cylinder bore;
at each one of the second plurality of positional zones, cause the laser head to create, sequentially, one at a time, a first plurality of discrete hardened pills therein;
cause the laser head to move sequentially to each of the plurality of cylinder bores within the engine;
at each cylinder bore, cause the laser head to move, sequentially, in the star pattern, to each one of the second plurality of positional zones extending circumferentially around the cylinder bore; and
at each one of the second plurality of positional zones, cause the laser head to create, sequentially, one at a time, a second plurality of discrete hardened pills therein.

12. The system of claim 11, wherein each of the plurality of cylinder bores includes twelve positional zones adjacent one another and extending circumferentially around the cylinder bore.

13. The system of claim 12, wherein the first plurality of positional zones includes first, third, fifth, seventh, ninth and eleventh positional zones;
wherein, the controller is adapted to cause the laser head to move, sequentially, starting at the fifth positional zone to the eleventh positional zone, from the eleventh positional zone to the seventh positional zone, from the seventh positional zone to the first positional zone, from the first positional zone to the ninth positional zone, and from the ninth positional zone to the third positional zone.

14. The system of claim 13, wherein the second plurality of positional zones includes second, fourth, sixth, eighth, tenth and twelfth positional zones;

wherein, the controller is adapted to cause the laser head to move, sequentially, starting at the sixth positional zone to the twelfth positional zone, from the twelfth positional zone to the eighth positional zone, from the eighth positional zone to the second positional zone, from the second positional zone to the tenth positional zone, and from the tenth positional zone to the fourth positional zone.

15. The system of claim 14, wherein the first plurality of discrete hardened pills includes a first discrete hardened pill, a third discrete hardened pill and a fifth discrete hardened pill, and the second plurality of discrete hardened pills includes a second discrete hardened pill and a fourth discrete hardened pill;
wherein, when creating, with the laser head, sequentially, one at a time, the first plurality of discrete hardened pills, the controller is further adapted to cause the laser head to create the first discrete hardened pill, cause the laser head to create the third discrete hardened pill, and cause the laser head to create the fifth discrete hardened pill; and
when creating, with the laser head, sequentially, one at a time, the second plurality of discrete hardened pills, the controller is further adapted to cause the laser head to create the second discrete hardened pill and cause the laser head to create the fourth discrete hardened pill.

16. The system of claim 15, wherein the engine includes eight cylinder bores and the laser head is a dual laser head unit;
wherein, when moving the laser head sequentially to each of the plurality of cylinder bores within the engine, the controller is further adapted to:
cause the dual laser head unit to move such that a first laser head is engaged with a first cylinder bore and a second laser head is engaged with a second cylinder bore;
cause the dual laser head unit to move such that the first laser head is engaged with a fifth cylinder bore and the second laser head is engaged with a sixth cylinder bore;
cause the dual laser head unit to move such that the first laser head is engaged with a seventh cylinder bore and the second laser head is engaged with an eighth cylinder bore; and
cause the dual laser head unit to move such that the first laser head is engaged with a third cylinder bore and the second laser head is engaged with a fourth cylinder bore.

17. The system of claim 16, wherein the controller is further adapted to:
cause the dual laser head unit to move such that the first laser head is engaged with the first cylinder bore and the second laser head is engaged with the second cylinder bore;
cause the first and second laser heads to move, sequentially, starting at the fifth positional zone, to the eleventh positional zone, the seventh positional zone, the first positional zone, the ninth positional zone, the third positional zone, the sixth positional zone, the twelfth positional zone, the eighth positional zone, the second positional zone, the tenth positional zone and the fourth positional zone within the first and second cylinder bores;
at each one of the fifth, eleventh, seventh, first, ninth and third positional zones within each of the first and second cylinder bores, cause the first and second laser heads to simultaneously temper each of the first and
second plurality of discrete hardened pills; and
at each one of the sixth, twelfth, eighth, second, tenth and
fourth positional zones within each of the first and
second cylinder bores, cause the first and second laser
heads to simultaneously temper each of the first and
second plurality of discrete hardened pills;
cause the dual laser head unit to move such that the first
laser head is engaged with the fifth cylinder bore and
the second laser head is engaged with the sixth cylinder
bore;
cause the first and second laser heads to move, sequentially, starting at the fifth positional zone, to the eleventh positional zone, the seventh positional zone, the
first positional zone, the ninth positional zone, the third
positional zone, the sixth positional zone, the twelfth
positional zone, the eighth positional zone, the second
positional zone, the tenth positional zone and the fourth
positional zone within the fifth and sixth cylinder bores;
at each one of the fifth, eleventh, seventh, first, ninth and
third positional zones within each of the fifth and sixth
cylinder bores, cause the first and second laser heads to
simultaneously temper each of the first and second
plurality of discrete hardened pills;
at each one of the sixth, twelfth, eighth, second, tenth and
fourth positional zones within each of the fifth and sixth
cylinder bores, cause the first and second laser heads to
simultaneously temper each of the first and second
plurality of discrete hardened pills;
cause the dual laser head unit to move such that the first
laser head is engaged with the seventh cylinder bore
and the second laser head is engaged with the eighth
cylinder bore;
cause the first and second laser heads to move, sequentially, starting at the fifth positional zone, to the eleventh positional zone, the seventh positional zone, the
first positional zone, the ninth positional zone, the third
positional zone, the sixth positional zone, the twelfth
positional zone, the eighth positional zone, the second
positional zone, the tenth positional zone and the fourth
positional zone within the seventh and eighth cylinder
bores;
at each one of the fifth, eleventh, seventh, first, ninth and
third positional zones within each of the seventh and
eighth cylinder bores, cause the first and second laser
heads to simultaneously temper each of the first and
second plurality of discete hardened pills;
at each one of the sixth, twelfth, eighth, second, tenth and
fourth positional zones within each of the seventh and
eighth cylinder bores, cause the first and second laser
heads to simultaneously temper each of the first and
second plurality of discrete hardened pills;
cause the dual laser head unit to move such that the first
laser head is engaged with the third cylinder bore and
the second laser head is engaged with the fourth
cylinder bore;
cause the first and second laser heads to move, sequentially, starting at the fifth positional zone, to the eleventh positional zone, the seventh positional zone, the
first positional zone, the ninth positional zone, the third
positional zone, the sixth positional zone, the twelfth
positional zone, the eighth positional zone, the second
positional zone, the tenth positional zone and the fourth
positional zone within the third and fourth cylinder
bores;
at each one of the fifth, eleventh, seventh, first, ninth and
third positional zones within each of the third and
fourth cylinder bores, cause the first and second laser
heads to simultaneously temper each of the first and
second plurality of discrete hardened pills; and
at each one of the sixth, twelfth, eighth, second, tenth and
fourth positional zones within each of the third and
fourth cylinder bores, cause the first and second laser
heads to simultaneously tempering each of the first and
second plurality of discrete hardened pills.
18. The system of claim 15, wherein the engine includes
eight cylinder bores and the laser head is a four laser head
unit;
wherein, when moving the laser head sequentially to each
of the plurality of cylinder bores within the engine, the
controller is further adapted to:
cause the four laser head unit to move such that a first
laser head is engaged with a first cylinder bore, a
second laser head is engaged with a second cylinder
bore, a third laser head is engaged with a fifth
cylinder bore and a fourth laser head is engaged with
a sixth cylinder bore; and
cause the four laser head unit to move such that a first
laser head is engaged with a third cylinder bore, a
second laser head is engaged with a fourth cylinder
bore, a third laser head is engaged with a seventh
cylinder bore and a fourth laser head is engaged with
an eighth cylinder bore.
19. The system of claim 18, wherein, the controller is
further adapted to:
cause the four laser head unit to move such that a first
laser head is engaged with a first cylinder bore, a
second laser head is engaged with a second cylinder
bore, a third laser head is engaged with a fifth cylinder
bore and a fourth laser head is engaged with a sixth
cylinder bore;
cause the first, second, third and fourth laser heads to
move, sequentially, starting at the fifth positional zone,
to the eleventh positional zone, the seventh positional
zone, the first positional zone, the ninth positional zone,
the third positional zone, the sixth positional zone, the
twelfth positional zone, the eighth positional zone, the
second positional zone, the tenth positional zone and
the fourth positional zone within the first, second, fifth
and sixth cylinder bores;
at each one of the fifth, eleventh, seventh, first, ninth and
third positional zones within each of the first, second,
fifth and sixth cylinder bores, cause the first, second,
third and fourth laser heads to simultaneously temper
each of the first and second plurality of discrete hardened pills; and
at each one of the sixth, twelfth, eighth, second, tenth and
fourth positional zones within each of the first, second,
fifth and sixth cylinder bores, cause the first, second,
third and fourth laser heads to simultaneously temper
each of the first and second plurality of discrete hardened pills;
cause the four laser head unit to move such that the first
laser head is engaged with a third cylinder bore, the
second laser head is engaged with a fourth cylinder
bore, the third laser head is engaged with a seventh
cylinder bore and the fourth laser head is engaged with
an eighth cylinder bore;
cause the first, second, third and fourth laser heads to
move, sequentially, starting at the fifth positional zone,
to the eleventh positional zone, the seventh positional
zone, the first positional zone, the ninth positional zone,
the third positional zone, the sixth positional zone, the
twelfth positional zone, the eighth positional zone, the second positional zone, the tenth positional zone and the fourth positional zone within the third, fourth, seventh and eighth cylinder bores;

at each one of the fifth, eleventh, seventh, first, ninth and third positional zones within each of the third, fourth, seventh and eighth cylinder bores, cause the first, second, third and fourth laser heads to simultaneously temper each of the first and second plurality of discrete hardened pills; and at each one of the sixth, twelfth, eighth, second, tenth and fourth positional zones within each of the third, fourth, seventh and eighth cylinder bores, cause the first, second, third and fourth laser heads to simultaneously temper each of the first and second plurality of discrete hardened pills.

20. A method of heat treating a plurality of cylinder bores within an engine, comprising:

moving a laser head, adapted to heat treat a localized area of an inner surface of a cylinder bore, sequentially to each of a plurality of cylinder bores within the engine;

at each cylinder bore, moving the laser head, sequentially, starting at a fifth positional zone to an eleventh positional zone, from the eleventh positional zone to a seventh positional zone, from the seventh positional zone to a first positional zone, from the first positional zone to a ninth positional zone, and from the ninth positional zone to a third positional zone;

at each one of the fifth, eleventh, seventh, first, ninth and third positional zones, creating, with the laser head, sequentially, one at a time, a first discrete hardened pill, a third discrete hardened pill and a fifth discrete hardened pill therein;

moving the laser head sequentially to each of the plurality of cylinder bores within the engine;

at each cylinder bore, moving the laser head, sequentially, starting at a fifth positional zone to an eleventh positional zone, from the eleventh positional zone to a seventh positional zone, from the seventh positional zone to a first positional zone, from the first positional zone to a ninth positional zone, and from the ninth positional zone to a third positional zone;

at each one of the fifth, eleventh, seventh, first, ninth and third positional zones, creating, with the laser head, sequentially, one at a time, a second discrete hardened pill and a fourth discrete hardened pill therein;

moving the laser head sequentially to each of the plurality of cylinder bores within the engine;

at each cylinder bore, moving the laser head, sequentially, starting at a sixth positional zone to a twelfth positional zone, from the twelfth positional zone to an eighth positional zone, from the eighth positional zone to a second positional zone, from the second positional zone to a tenth positional zone, and from the tenth positional zone to a fourth positional zone;

at each one of the sixth, twelfth, eighth, second, tenth and fourth positional zones, creating, with the laser head, sequentially, one at a time, a first discrete hardened pill, a third discrete hardened pill and a fifth discrete hardened pill therein;

moving the laser head sequentially to each of the plurality of cylinder bores within the engine;

at each cylinder bore, moving the laser head, sequentially, starting at a sixth positional zone to an twelfth positional zone, from the twelfth positional zone to an eighth positional zone, from the eighth positional zone to a second positional zone, from the second positional zone to a tenth positional zone, and from the tenth positional zone to a fourth positional zone; and at each one of the sixth, twelfth, eighth, second, tenth and fourth positional zones, creating, with the laser head, sequentially, one at a time, a second discrete hardened pill and a fourth discrete hardened pill therein;

moving the laser head sequentially to each of the plurality of cylinder bores within the engine, at each cylinder bore, moving the laser head, sequentially, starting at the fifth positional zone to the eleventh positional zone, from the eleventh positional zone to the seventh positional zone, from the seventh positional zone to the first positional zone, from the first positional zone to the ninth positional zone, from the ninth positional zone to the third positional zone, from the third positional zone to the sixth positional zone, from the sixth positional zone to the twelfth positional zone, from the twelfth positional zone to the eighth positional zone, from the eighth positional zone to the second positional zone, from the second positional zone to the tenth positional zone, and from the tenth positional zone to the fourth positional zone;

at each one of the fifth, eleventh, seventh, first, ninth, third, sixth, twelfth, eighth, second, tenth and fourth positional zones within each of the cylinder bores, simultaneously tempering, with the laser head, each of the first, second, third, fourth and fifth discrete hardened pills.

* * * * *